(12) United States Patent
Da et al.

(10) Patent No.: US 11,388,049 B2
(45) Date of Patent: Jul. 12, 2022

(54) RESOURCE CONFIGURATION METHOD AND APPARATUS, AND COMPUTER STORAGE MEDIUM

(71) Applicant: China Academy of Telecommunications Technology, Beijing (CN)

(72) Inventors: Ren Da, Beijing (CN); Tie Li, Beijing (CN); Ekpenyong Tony, Beijing (CN); Fang-Chen Cheng, Beijing (CN); Qiubin Gao, Beijing (CN); Bin Ren, Beijing (CN); Zheng Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/763,986

(22) PCT Filed: Oct. 24, 2018

(86) PCT No.: PCT/CN2018/111750
§ 371 (c)(1),
(2) Date: May 14, 2020

(87) PCT Pub. No.: WO2019/095954
PCT Pub. Date: May 23, 2019

(65) Prior Publication Data
US 2020/0396122 A1    Dec. 17, 2020

(30) Foreign Application Priority Data
Nov. 14, 2017   (CN) .......................... 201711123018.0

(51) Int. Cl.
*H04L 41/0806* (2022.01)
*H04L 7/00* (2006.01)
*H04L 41/0896* (2022.01)

(52) U.S. Cl.
CPC ........ *H04L 41/0806* (2013.01); *H04L 7/0008* (2013.01); *H04L 41/0896* (2013.01)

(58) Field of Classification Search
CPC .............. H04L 41/0806; H04L 7/0008; H04L 41/0896; H04L 27/26025; H04L 5/0094;
(Continued)

(56) References Cited

U.S. PATENT DOCUMENTS

| 2017/0251460 | A1  | 8/2017 | Agiwal et al. | |
|---|---|---|---|---|
| 2020/0162222 | A1* | 5/2020 | Liu | ........................ H04W 48/16 |
| 2020/0288442 | A1* | 9/2020 | Murayama | ........ H04L 27/26025 |

FOREIGN PATENT DOCUMENTS

CN    107278383 A    10/2017

OTHER PUBLICATIONS

3GPP TSG RAN WG1 Meeting #90bis Prague, Czech Republic, Oct. 9-13, 2017, 2017 (Year: 2017).*
(Continued)

*Primary Examiner* — Hardikkumar D Patel
(74) *Attorney, Agent, or Firm* — Kilpatrick Townsend & Stockton, LLP

(57) ABSTRACT

Disclosed are a resource configuration method and apparatus, and a computer storage medium, being used for enabling, when a remaining minimum system information control resource set and an associated synchronization information block are in a time division multiplexing mode, the configuration of the remaining minimum system information control resource set to be more flexible, being applicable to more application scenarios. The resource configuration method comprises: determining that a remaining
(Continued)

minimum system information control resource set (RMSI CORESET) and an associated synchronization information block (SS Block) occupy different symbols for transmission in a time division multiplexing mode; and determining the configuration parameters of the RMSI CORESET and the associated SS Block, the remaining minimum system information control resource sets associated with the SS Blocks in each SS Block burst set having identical configuration parameters.

19 Claims, 8 Drawing Sheets

(58) Field of Classification Search
CPC .. H04L 27/2602; H04L 5/0048; H04W 72/04; H04W 72/0446; H04W 56/001; H04W 415/0048; H04W 72/0453
See application file for complete search history.

(56) References Cited

OTHER PUBLICATIONS

Nokia et al.,"Remaining details on NR-PBCH", 3GPP TSG-RAN WG1 NR AH#3, Nagoya, Japan, Sep. 18-21, 2017, total 13 pages, R1-1716524.

NTT Docomo, Inc.,"Discussion on remaining details on RMSI delivery", 3GPP TSG RAN WG1 Meeting 90bis, Prague, CZ, Oct. 9-13, 2017, total 7 pages, R1-1718181.

Vivo "Discussion on Remaining Minimum System Information", 3GPP TSG RAN WG1 Meeting #90bis Prague, Czech Republic, Oct. gth-13th, 2017, total 15 pages, R1-1717461.

Samsung "Remaining details on remaining minimum system information delivery" 3GPP TSG RAN WG1#90b Prague, Czech Republic, Oct. 9-13, 2017. R1-1717578.

InterDigital Inc. "On Remaining Issues of Remaining Minimum System Information Delivery" 3GPP TSG RAN WG1 Meeting 90bis Prague, Czech Republic, Oct. 9-13, 2017. R1-1718474.

Sony "Remaining details on remaining minimum system information" 3GPP TSG RAN WG1 Meeting NR#3 Prague, Czech Republic, Oct. 9-13, 2017. R1-1718664.

Ericsson "Remaining details of remaining minimum system information" 3GPP TSG RAN WG1 Meeting 90bis Prague, Czech Republic, Oct. 9-13, 2017. R1-1718712.

CATT "Offline summary for AI 7.1.2.2 Remaining details on Remaining Minimum System Information" 3GPP TSG RAN WG1 Meeting 90bis Prague, CZ, Oct. 9-13, 2017. R1-1718772.

* cited by examiner

RMSI SCS (Remaining Minimum System Information Subcarrier Spacing)
SSB SCS (Synchronized Block Subcarrier Spacing)
SSB (Synchronized Block)

SSB (Synchronized Block)

RMSI SCS (Remaining Minimum System Information Subcarrier Spacing)
SSB SCS (Synchronized Block Subcarrier Spacing)
SSB (Synchronized Block)

RESOURCE CONFIGURATION METHOD AND APPARATUS, AND COMPUTER STORAGE MEDIUM

The present application is a US National Stage of International Application No. PCT/CN2018/111750, filed on Oct. 24, 2018, which claims the priority from Chinese Patent Application No. 201711123018.0, filed with the Chinese Patent Office on Nov. 14, 2017 and entitled "Resource Configuration Method and Apparatus, and Computer Storage Medium", which is hereby incorporated by reference in its entirety.

FIELD

The present application relates to the field of communication technologies, and particularly to a resource configuration method and device and a computer storage medium.

BACKGROUND

The Minimum System Information (MSI) is the system information necessary for initial access of a terminal, where a part of the MSI is transmitted through the New Radio (NR)-Physical Broadcasting Channel (PBCH), which is called NR-PBCH for short, while the Remaining Minimum System Information (RMSI) is transmitted through the NR-PDSCH. In addition, the NR-PDSCH transmitting the RMSI is scheduled by the NR-PDCCH. This NR-PDCCH (used to schedule the NR-PDSCH bearing the RMSI) is indicated by the configuration parameter of the RMSI Control Resource Set (CORESET). Here the configuration parameter of the RMSI CORESET is transmitted over the NR-PBCH. As discussed in the current standard, the maximum bit width of the configuration parameter of the RMSI CORESET is 8 bits.

Each RMSI CORESET is associated with one Synchronized Block (SS Block, which is also called SSB for short). There are two multiplexing modes, which are Frequency Division Multiplexing (FDM) and Time Division Multiplexing (TDM), for the RMSI CORESET and the SS Block. In the TDM mode, the RMSI CORESET associated with the SS Block is transmitted over different symbols in the time domain. It is required to support the TDM mode when the FDM mode is not supported in the system.

SUMMARY

The embodiments of the present application provide a resource configuration method and apparatus, and a computer storage medium, to enable the configuration of the remaining minimum system information control resource set to be more flexible when the remaining minimum system information control resource set and the associated synchronous information block adopt the time division multiplexing mode, and to be applicable to more application scenarios.

A resource configuration method provided by an embodiment of the present application includes:
determining that an RMSI CORESET and an associated SS Block occupy different symbols for transmission in a time division multiplexing mode;
determining configuration parameters of the RMSI CORESET and the associated SS Block, where remaining minimum system information control resource sets associated with respective SS Blocks in each SS Block burst set have same configuration parameters.

With this method, it is determined that the RMSI CORESET and the associated SS Block occupy different symbols for transmission in the time division multiplexing mode; and the configuration parameters of the RMSI CORESET and the associated SS Block is determined, wherein the remaining minimum system information control resource sets associated with the respective SS Blocks in each SS Block burst set have the same configuration parameters, to enable the configuration of the remaining minimum system information control resource set to be more flexible when the remaining minimum system information control resource set and the associated synchronous information block adopt the time division multiplexing mode, and to be applicable to more application scenarios.

In one embodiment, the configuration parameters of the RMSI CORESET include one or a combination of:
the bandwidth occupied by the RMSI CORESET;
the time-domain position of the RMSI CORESET;
the frequency-domain position of the RMSI CORESET;
the number of consecutive or non-consecutive time-domain symbols occupied by the RMSI CORESET.

In one embodiment, when the configuration parameters of the RMSI CORESET include the frequency-domain position of the RMSI CORESET, frequency-domain positions of the RMSI CORESET and the associated SS Block satisfy one of the following relationships:
the RMSI CORESET and the associated SS Block share a configured center frequency-domain position;
the whole configured frequency-domain position of the RMSI CORESET is located below the frequency-domain position of the associated SS Block;
the whole configured frequency-domain position of the RMSI CORESET is located above the frequency-domain position of the associated SS Block.

In one embodiment, when the configuration parameters of the RMSI CORESET include the frequency-domain position of the RMSI CORESET, the frequency-domain position of the RMSI CORESET is a relative offset value with respect to the frequency-domain position of the associated SS Block.

In one embodiment, the relative offset value is a preset value.

In one embodiment, the relative offset value is different in different frequency bands or frequency ranges.

In one embodiment, the relative offset value is represented by c, and values of c are as follows and respectively used to indicate the following different information:
when $c=0$, it indicates that center frequencies of the RMSI CORESET and the associated SS Block are aligned;
when $c=1$, it indicates that frequency-domain start positions of the RMSI CORESET and the associated SS Block are aligned;
when $c=2$, it indicates that frequency-domain end positions of the RMSI CORESET and the associated SS Block are aligned;
when $c=3$, it indicates that a frequency-domain end position of the RMSI CORESET is aligned with an end position of a terminal minimum carrier bandwidth, but a frequency-domain start position of the associated SS Block is aligned with a start position of the terminal minimum carrier bandwidth;
when $c=4$, it indicates that a frequency-domain start position of the RMSI CORESET is aligned with a start position of the terminal minimum carrier bandwidth, but a frequency-domain end position of the associated SS Block is aligned with an end position of the terminal minimum carrier bandwidth;

where the terminal minimum carrier bandwidth is preset.

In one embodiment, when the configuration parameters of the RMSI CORESET include the time-domain position of the RMSI CORESET, if a combination of SS Block Subcarrier Spacing (SCS) and RMSI CORESET SCS written {SS Block SCS, RMSI CORESET SCS} is {15, 15} kHz, the time-domain position of the RMSI CORESET adopts one of the following configurations:

first configuration: the time-domain position of the RMSI CORESET precedes a time-domain position of the associated SS Block;

the RMSI CORESET occupies 1 time-domain symbol, and the offset from the time-domain position of the associated SS Block to the time-domain position of the RMSI CORESET is −1; or the RMSI CORESET occupies 1 time-domain symbol, and the offset from the time-domain position of the associated SS Block to the time-domain position of the RMSI CORESET is −2; or the RMSI CORESET occupies 2 time-domain symbols, and the offset from the time-domain position of the associated SS Block to the time-domain position of the RMSI CORESET is −2;

second configuration: the time-domain position of the RMSI CORESET is behind the time-domain position of the associated SS Block;

the RMSI CORESET occupies 1 time-domain symbol, and the offset from the time-domain position of the associated SS Block to the time-domain position of the RMSI CORESET is +1; or the RMSI CORESET occupies 1 time-domain symbol, and the offset from the time-domain position of the associated SS Block to the time-domain position of the RMSI CORESET is +2; or the RMSI CORESET occupies 2 time-domain symbols, and the offset from the time-domain position of the associated SS Block to the time-domain position of the RMSI CORESET is +2;

third configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;

the RMSI CORESET occupies 1 time-domain symbol, and when mod (SSB Index, 2)={0} is satisfied, the offset from the time-domain position of the associated SS Block to the time-domain position of the RMSI CORESET is −1; when mod (SSB Index, 2)={1} is satisfied, the offset from the time-domain position of the associated SS Block to the time-domain position of the RMSI CORESET is +1; or the RMSI CORESET occupies 1 time-domain symbol, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2; or the RMSI CORESET occupies 2 time-domain symbols, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2;

fourth configuration: the time-domain position of the RMSI CORESET associated with an SS Block with an even index is behind a time-domain position of this SS Block; and the time-domain position of the RMSI CORESET associated with an SS Block with an odd index precedes a time-domain position of this SS Block;

the RMSI CORESET occupies 1 time-domain symbol, and when mod (SSB Index, 2)={0} is satisfied, the offset from the time-domain position of the associated SS Block to the time-domain position of the RMSI CORESET is +1; when mod (SSB Index, 2)={1} is satisfied, the offset from the time-domain position of the associated SS Block to the time-domain position of the RMSI CORESET is −1;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 30} kHz, the time-domain position of the RMSI CORESET adopts one of the following configurations:

first configuration: the time-domain position of the RMSI CORESET precedes a time-domain position of the associated SS Block, and the offset from the time-domain position of the associated SS Block to the time-domain position of the RMSI CORESET is −B;

second configuration: the time-domain position of the RMSI CORESET is behind the time-domain position of the associated SS Block, and the offset from the time-domain position of the associated SS Block to the time-domain position of the RMSI CORESET is +B;

third configuration: the time-domain position of the RMSI CORESET associated with an SS Block with an even index precedes a time-domain position of this SS Block, and the offset from the time-domain position of the associated SS Block to the time-domain position of the RMSI CORESET is −B; the time-domain position of the RMSI CORESET associated with an SS Block with an odd index is behind a time-domain position of this SS Block, and the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 30} or {120, 120} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;

second configuration: when mod (SSB Index, 4)={0, 2} is satisfied, the offset from the time-domain position of the associated SS Block to the time-domain position of the RMSI CORESET is −B; where "SSB" is SS Block;

third configuration: when mod (SSB Index, 4)={1, 3} is satisfied, the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 15} or {120, 60} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;
- when mod (SSB Index, 4)={0, 2} is satisfied, the offset from the time-domain position of the associated SS Block to the time-domain position of the RMSI CORESET is −1; where "SSB" is SS Block;
- when mod (SSB Index, 4)={1, 3} is satisfied, the offset from the time-domain position of the associated SS Block to the time-domain position of the RMSI CORESET is +1;

second configuration: the time-domain position of the RMSI CORESET precedes the time-domain position of the associated SS Block;
- when mod (SSB Index, 4)={0, 2} is satisfied, the offset from the time-domain position of the associated SS Block to the time-domain position of the RMSI CORESET is −2;
- when mod (SSB Index, 4)={1, 3} is satisfied, the offset from the time-domain position of the associated SS Block to the time-domain position of the RMSI CORESET is −5;

third configuration: the time-domain position of the RMSI CORESET is behind the time-domain position of the associated SS Block;
- when mod (SSB Index, 4)={0, 2} is satisfied, the offset from the time-domain position of the associated SS Block to the time-domain position of the RMSI CORESET is +4;
- when mod (SSB Index, 4)={1, 3} is satisfied, the offset from the time-domain position of the associated SS Block to the time-domain position of the RMSI CORESET is +5.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 120} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;
- when mod (SSB Index, 4)={0, 1} is satisfied, the offset from the time-domain position of the associated SS Block to the time-domain position of the RMSI CORESET is −2 or −3 time-domain symbols of 120 kHz;
- when mod (SSB Index, 4)={2, 3} is satisfied, the offset from the time-domain position of the associated SS Block to the time-domain position of the RMSI CORESET is +4 or +3 time-domain symbols of 120 kHz;

second configuration: the time-domain position of the RMSI CORESET precedes the time-domain position of the associated SS Block;
- when mod (SSB Index, 4)=n is satisfied, the offset from the time-domain position of the associated SS Block to the time-domain position of the RMSI CORESET is −((4−n)+2*n) time-domain symbols of 120 kHz;

third configuration: the time-domain position of the RMSI CORESET is behind the time-domain position of the associated SS Block;
- when mod (SSB Index, 4)=n is satisfied, the offset from the time-domain position of the associated SS Block to the time-domain position of the RMSI CORESET is +(n+2*(4−n)) time-domain symbols of 120 kHz;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 60} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;
- when mod (SSB Index, 4)=n={0, 1} is satisfied, the offset from the time-domain position of the associated SS Block to the time-domain position of the RMSI CORESET is −(n+1) time-domain symbols of 60 kHz;
- when mod (SSB Index, 4)=n={2, 3} is satisfied, the offset from the time-domain position of the associated SS Block to the time-domain position of the RMSI CORESET is +(4−n) time-domain symbols of 60 kHz;

second configuration: the time-domain position of the RMSI CORESET precedes the time-domain position of the associated SS Block;
- when mod (SSB Index, 4)=n={0, 1} is satisfied, the offset from the time-domain position of the associated SS Block to the time-domain position of the RMSI CORESET is −(2+n) time-domain symbols of 60 kHz;
- when mod (SSB Index, 4)=n={2, 3} is satisfied, the offset from the time-domain position of the associated SS Block to the time-domain position of the RMSI CORESET is −(1+n) time-domain symbols of 60 kHz;

third configuration: the time-domain position of the RMSI CORESET is behind the time-domain position of the associated SS Block;
- when mod (SSB Index, 4)=n={0, 1} is satisfied, the offset from the time-domain position of the associated SS Block to the time-domain position of the RMSI CORESET is (4−n) time-domain symbols of 60 kHz;
- when mod (SSB Index, 4)=n={2, 3} is satisfied, the offset from the time-domain position of the associated SS Block to the time-domain position of the RMSI CORESET is (5−n) time-domain symbols of 60 kHz;

where "SSB" is SS Block.

In one embodiment, determining configuration parameters of the RMSI CORESET and the associated SS Block, includes: for same or different configurations of SS Block Subcarrier Spacings, SCSs, and RMSI CORESET SCSs, if an SS Block is not actually sent, a time-domain position where the SS Block is not actually sent is configured for the RMSI CORESET.

In one embodiment, if a combination of SS Block SCS and RMSI CORESET SCS written {SS Block SCS, RMSI CORESET SCS} is {240, 120} or {240, 60} kHz, a position of one of every eight SS Blocks is configured as a time-domain position of the RMSI CORESET.

In one embodiment, if the combination of SS Block SCS and RMSI CORESET SCS written {SS Block SCS, RMSI CORESET SCS} is {240, 120} kHz, the time-domain position of the RMSI CORESET adopts the following configuration:

a candidate time-domain position of an SS Block of which an index is mod (SSB Index, 7) is configured for the RMSI CORESET; the number of time-domain symbols occupied by the RMSI CORESET is B={1, 2} time-domain symbol(s); where:

when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is $-((2-n)*B+2*n)$ time-domain symbols of 120 kHz;

when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is $(2*(4-n)+(n-2)*B)$ time-domain symbols of 120 kHz;

when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is $(2*(7-n)+(n-4)*B)$ time-domain symbols of 120 kHz;

where "SSB" is SS Block, and n is a preset value.

In one embodiment, if the combination of SS Block SCS and RMSI CORESET SCS written {SS Block SCS, RMSI CORESET SCS} is {240, 60} kHz, the time-domain position of the RMSI CORESET adopts the following configuration:

a candidate time-domain position of an SS Block of which an index is mod (SSB Index, 7) is configured for the RMSI CORESET; the number of time-domain symbols occupied by the RMSI CORESET is B={1} time-domain symbol; where:

when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is $-2$ time-domain symbols of 120 kHz;

when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is 2 time-domain symbols of 120 kHz;

when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is 3 time-domain symbols of 120 kHz;

where "SSB" is SS Block.

In one embodiment, the configuration parameters of the RMSI CORESET include the total number of Physical Resource Blocks, PRBs, occupied by the RMSI CORESET, where the number of PRBs is a discrete candidate set.

In one embodiment, the discrete candidate set is {48, 72, 96}.

In one embodiment, the configuration parameters of the RMSI CORESET include a combination of the bandwidth occupied by the RMSI CORESET and the number of consecutive time-domain symbols occupied by the RMSI CORESET, the combination is specifically one of:
{48 PRBs, 1 time-domain symbol};
{72 PRBs, 1 time-domain symbol};
{96 PRBs, 1 time-domain symbol};
{24 PRBs, 2 consecutive time-domain symbols};
{36 PRBs, 2 consecutive time-domain symbols};
{48 PRBs, 2 consecutive time-domain symbols};
{16 PRBs, 3 consecutive time-domain symbols};
{24 PRBs, 3 consecutive time-domain symbols};
{32 PRBs, 3 consecutive time-domain symbols};
{12 PRBs, 4 consecutive time-domain symbols};
{18 PRBs, 4 consecutive time-domain symbols};
{24 PRBs, 4 consecutive time-domain symbols};
where "PRBs" represent a plurality of physical resource blocks.

A resource configuration device provided by an embodiment of the present application includes:
a memory configured to store program instructions;
a processor configured to invoke the program instructions stored in the memory, and in accordance with the obtained program, to perform:
determining that an RMSI CORESET and an associated SS Block occupy different symbols for transmission in a time division multiplexing mode;
determining configuration parameters of the RMSI CORESET and the associated SS Block, where remaining minimum system information control resource sets associated with respective SS Blocks in each SS Block burst set have same configuration parameters.

In one embodiment, the configuration parameters of the RMSI CORESET include one or a combination of:
the bandwidth occupied by the RMSI CORESET;
the time-domain position of the RMSI CORESET;
the frequency-domain position of the RMSI CORESET;
the number of consecutive or non-consecutive time-domain symbols occupied by the RMSI CORESET.

In one embodiment, when the configuration parameters of the RMSI CORESET include the frequency-domain position of the RMSI CORESET, frequency-domain positions of the RMSI CORESET and the associated SS Block satisfy one of the following relationships:
the RMSI CORESET and the associated SS Block share a configured center frequency-domain position;
the whole configured frequency-domain position of the RMSI CORESET is located below the frequency-domain position of the associated SS Block;
the whole configured frequency-domain position of the RMSI CORESET is located above the frequency-domain position of the associated SS Block.

In one embodiment, when the configuration parameters of the RMSI CORESET include the frequency-domain position of the RMSI CORESET, the frequency-domain position of the RMSI CORESET is a relative offset value with respect to the frequency-domain position of the associated SS Block.

In one embodiment, the relative offset value is a preset value.

In one embodiment, the relative offset value is different in different frequency bands or frequency ranges.

In one embodiment, the relative offset value is represented by c, and values of c are as follows and respectively used to indicate the following different information:

when c=0, it indicates that center frequencies of the RMSI CORESET and the associated SS Block are aligned;

when c=1, it indicates that frequency-domain start positions of the RMSI CORESET and the associated SS Block are aligned;

when c=2, it indicates that frequency-domain end positions of the RMSI CORESET and the associated SS Block are aligned;

when c=3, it indicates that a frequency-domain end position of the RMSI CORESET is aligned with an end position of a terminal minimum carrier bandwidth, but a frequency-domain start position of the associated SS Block is aligned with a start position of the terminal minimum carrier bandwidth;

when c=4, it indicates that a frequency-domain start position of the RMSI CORESET is aligned with a start position of a terminal minimum carrier bandwidth, but a frequency-domain end position of the associated SS Block is aligned with an end position of the terminal minimum carrier bandwidth;

wherein the terminal minimum carrier bandwidth is preset.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 15} kHz, the time-domain position of the RMSI CORESET adopts one of the following configurations:

first configuration: the time-domain position of the RMSI CORESET precedes a time-domain position of the associated SS Block;
the RMSI CORESET occupies 1 time-domain symbol, and the offset from the time-domain position of the associated SS Block to the time-domain position of the RMSI CORESET is −1; or
the RMSI CORESET occupies 1 time-domain symbol, and the offset from the time-domain position of the associated SS Block to the time-domain position of the RMSI CORESET is −2; or
the RMSI CORESET occupies 2 time-domain symbols, and the offset from the time-domain position of the associated SS Block to the time-domain position of the RMSI CORESET is −2;

second configuration: the time-domain position of the RMSI CORESET is behind the time-domain position of the associated SS Block;
the RMSI CORESET occupies 1 time-domain symbol, and the offset from the time-domain position of the associated SS Block to the time-domain position of the RMSI CORESET is +1; or
the RMSI CORESET occupies 1 time-domain symbol, and the offset from the time-domain position of the associated SS Block to the time-domain position of the RMSI CORESET is +2; or
the RMSI CORESET occupies 2 time-domain symbols, and the offset from the time-domain position of the associated SS Block to the time-domain position of the RMSI CORESET is +2;

third configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;
the RMSI CORESET occupies 1 time-domain symbol, and when mod (SSB Index, 2)={0} is satisfied, the offset from the time-domain position of the associated SS Block to the time-domain position of the RMSI CORESET is −1; when mod (SSB Index, 2)={1} is satisfied, the offset from the time-domain position of the associated SS Block to the time-domain position of the RMSI CORESET is +1; or
the RMSI CORESET occupies 1 time-domain symbol, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2; or
the RMSI CORESET occupies 2 time-domain symbols, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2;

fourth configuration: the time-domain position of the RMSI CORESET associated with an SS Block with an even index is behind a time-domain position of this SS Block; and the time-domain position of the RMSI CORESET associated with an SS Block with an odd index precedes a time-domain position of this SS Block;
the RMSI CORESET occupies 1 time-domain symbol, and when mod (SSB Index, 2)={0} is satisfied, the offset from the time-domain position of the associated SS Block to the time-domain position of the RMSI CORESET is +1; when mod (SSB Index, 2)={1} is satisfied, the offset from the time-domain position of the associated SS Block to the time-domain position of the RMSI CORESET is −1;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 30} kHz, the time-domain position of the RMSI CORESET adopts one of the following configurations:

first configuration: the time-domain position of the RMSI CORESET precedes a time-domain position of the associated SS Block, and the offset from the time-domain position of the associated SS Block to the time-domain position of the RMSI CORESET is −B;

second configuration: the time-domain position of the RMSI CORESET is behind the time-domain position of the associated SS Block, and the offset from the time-domain position of the associated SS Block to the time-domain position of the RMSI CORESET is +B;

third configuration: the time-domain position of the RMSI CORESET associated with an SS Block with an even index precedes a time-domain position of this SS Block, and the offset from the time-domain position of the associated SS Block to the time-domain position of the RMSI CORESET is −B; the time-domain position of the RMSI CORESET associated with an SS Block with an odd index is behind a time-domain position of this SS Block, and the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS {SS Block SCS, RMSI CORESET SCS} is {30, 30} or {120, 120} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;

second configuration: when mod (SSB Index, 4)={0, 2} is satisfied, the offset from the time-domain position of the associated SS Block to the time-domain position of the RMSI CORESET is −B; where "SSB" is SS Block;

third configuration: when mod (SSB Index, 4)={1, 3} is satisfied, the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 15} or {120, 60} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;

when mod (SSB Index, 4)={0, 2} is satisfied, the offset from the time-domain position of the associated SS Block to the time-domain position of the RMSI CORESET is −1; where "SSB" is SS Block;

when mod (SSB Index, 4)={1, 3} is satisfied, the offset from the time-domain position of the associated SS Block to the time-domain position of the RMSI CORESET is +1;

second configuration: the time-domain position of the RMSI CORESET precedes the time-domain position of the associated SS Block;

when mod (SSB Index, 4)={0, 2} is satisfied, the offset from the time-domain position of the associated SS Block to the time-domain position of the RMSI CORESET is −2;

when mod (SSB Index, 4)={1, 3} is satisfied, the offset from the time-domain position of the associated SS Block to the time-domain position of the RMSI CORESET is −5;

third configuration: the time-domain position of the RMSI CORESET is behind the time-domain position of the associated SS Block;

when mod (SSB Index, 4)={0, 2} is satisfied, the offset from the time-domain position of the associated SS Block to the time-domain position of the RMSI CORESET is +4;

when mod (SSB Index, 4)={1, 3} is satisfied, the offset from the time-domain position of the associated SS Block to the time-domain position of the RMSI CORESET is +5.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 120} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;

when mod (SSB Index, 4)={0, 1} is satisfied, the offset from the time-domain position of the associated SS Block to the time-domain position of the RMSI CORESET is −2 or −3 time-domain symbols of 120 kHz;

when mod (SSB Index, 4)={2, 3} is satisfied, the offset from the time-domain position of the associated SS Block to the time-domain position of the RMSI CORESET is +4 or +3 time-domain symbols of 120 kHz;

second configuration: the time-domain position of the RMSI CORESET precedes the time-domain position of the associated SS Block;

when mod (SSB Index, 4)=n is satisfied, the offset from the time-domain position of the associated SS Block to the time-domain position of the RMSI CORESET is −((4−n)+2*n) time-domain symbols of 120 kHz;

third configuration: the time-domain position of the RMSI CORESET is behind the time-domain position of the associated SS Block;

when mod (SSB Index, 4)=n is satisfied, the offset from the time-domain position of the associated SS Block to the time-domain position of the RMSI CORESET is +(n+2*(4−n)) time-domain symbols of 120 kHz;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 60} kHz, the time-domain position of the RMSI CORESET adopts one of the following configurations:

first configuration: the time-domain position of the RMSI CORESET associated with an SS Block with an even index precedes a time-domain position of this SS Block; and the time-domain position of the RMSI CORESET associated with an SS Block with an odd index is behind a time-domain position of this SS Block;

when mod (SSB Index, 4)=n={0, 1} is satisfied, the offset from the time-domain position of the associated SS Block to the time-domain position of the RMSI CORESET is −(n+1) time-domain symbols of 60 kHz;

when mod (SSB Index, 4)=n={2, 3} is satisfied, the offset from the time-domain position of the associated SS Block to the time-domain position of the RMSI CORE-SET is +(4−n) time-domain symbols of 60 kHz;
second configuration: the time-domain position of the RMSI CORESET precedes the time-domain position of the associated SS Block;
when mod (SSB Index, 4)=n={0, 1} is satisfied, the offset from the time-domain position of the associated SS Block to the time-domain position of the RMSI CORE-SET is −(2+n) time-domain symbols of 60 kHz;
when mod (SSB Index, 4)=n={2, 3} is satisfied, the offset from the time-domain position of the associated SS Block to the time-domain position of the RMSI CORE-SET is −(1+n) time-domain symbols of 60 kHz;
third configuration: the time-domain position of the RMSI CORESET is behind the time-domain position of the associated SS Block;
when mod (SSB Index, 4)=n={0, 1} is satisfied, the offset from the time-domain position of the associated SS Block to the time-domain position of the RMSI CORE-SET is (4−n) time-domain symbols of 60 kHz;
when mod (SSB Index, 4)=n={2, 3} is satisfied, the offset from the time-domain position of the associated SS Block to the time-domain position of the RMSI CORE-SET is (5−n) time-domain symbols of 60 kHz;
where "SSB" is SS Block.

In one embodiment, determining configuration parameters of the RMSI CORESET and the associated SS Block, includes: for same or different configurations of SS Block Subcarrier Spacings, SCSs, and RMSI CORESET SCSs, if an SS Block is not actually sent, a time-domain position where the SS Block is not actually sent is configured for the RMSI CORESET.

In one embodiment, if a combination of SS Block SCS and RMSI CORESET SCS {SS Block SCS, RMSI CORESET SCS} is {240, 120} or {240, 60} kHz, a position of one of every eight SS Blocks is configured as a time-domain position of the RMSI CORESET.

In one embodiment, if the combination of SS Block SCS and RMSI CORESET SCS {SS Block SCS, RMSI CORESET SCS} is {240, 120} kHz, the time-domain position of the RMSI CORESET adopts the following configuration:
a candidate time-domain position of an SS Block of which an index is mod (SSB Index, 7) is configured for the RMSI CORESET; the number of time-domain symbols occupied by the RMSI CORESET is B={1, 2} time-domain symbol(s); where:
when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is −((2−n)*B+2*n) time-domain symbols of 120 kHz;
when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is (2*(4−n)+(n−2)*B) time-domain symbols of 120 kHz;
when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is (2*(7−n)+(n−4)*B) time-domain symbols of 120 kHz;
where "SSB" is SS Block, and n is a preset value.

In one embodiment, if the combination of SS Block SCS and RMSI CORESET SCS written {SS Block SCS, RMSI CORESET SCS} is {240, 60} kHz, the time-domain position of the RMSI CORESET adopts the following configuration:
a candidate time-domain position of an SS Block of which an index is mod (SSB Index, 7) is configured for the RMSI CORESET; the number of time-domain symbols occupied by the RMSI CORESET is B={1} time-domain symbol; where:
when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is −2 time-domain symbols of 120 kHz;
when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is 2 time-domain symbols of 120 kHz;
when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is 3 time-domain symbols of 120 kHz;
where "SSB" is SS Block.

In one embodiment, the configuration parameters of the RMSI CORESET include the total number of Physical Resource Blocks, PRBs, occupied by the RMSI CORESET, where the number of PRBs is a discrete candidate set.

In one embodiment, the discrete candidate set is {48, 72, 96}.

In one embodiment, the configuration parameters of the RMSI CORESET include a combination of the bandwidth occupied by the RMSI CORESET and the number of consecutive time-domain symbols occupied by the RMSI CORESET, the combination is specifically one of:
{48 PRBs, 1 time-domain symbol};
{72 PRBs, 1 time-domain symbol};
{96 PRBs, 1 time-domain symbol};
{24 PRBs, 2 consecutive time-domain symbols};
{36 PRBs, 2 consecutive time-domain symbols};
{48 PRBs, 2 consecutive time-domain symbols};
{16 PRBs, 3 consecutive time-domain symbols};
{24 PRBs, 3 consecutive time-domain symbols};
{32 PRBs, 3 consecutive time-domain symbols};
{12 PRBs, 4 consecutive time-domain symbols};
{18 PRBs, 4 consecutive time-domain symbols};
{24 PRBs, 4 consecutive time-domain symbols};
wherein "PRBs" represent a plurality of physical resource blocks.

Another resource configuration device provided by an embodiment of the present application includes:
a first unit configured to determine that an RMSI CORESET and an associated SS Block occupy different symbols for transmission in a time division multiplexing mode;
a second unit configured to determine configuration parameters of the RMSI CORESET and the associated SS Block, where remaining minimum system information control resource sets associated with respective SS Blocks in each SS Block burst set have same configuration parameters.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

In order to make the purposes, technical solutions and advantages of the invention clearer, the technical solutions in the embodiments of the invention will be described clearly and completely below in combination with the accompanying drawings in the embodiments of the invention. Obviously the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the invention, the base station (e.g., access point) may mean the device in the access network communicating with the wireless terminal via one or more sectors over the air interface. The base station may be used to perform the interconversion between the received air frame and the IP packet, and used as the router between the wireless terminal and the rest of the access network, here the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

The embodiments of the present application provide a resource configuration method and apparatus, and a computer storage medium, to enable the configuration of the remaining minimum system information control resource set to be more flexible when the remaining minimum system information control resource set and the associated synchronous information block adopt the time division multiplexing mode, and to be applicable to more application scenarios.

Figure 1:
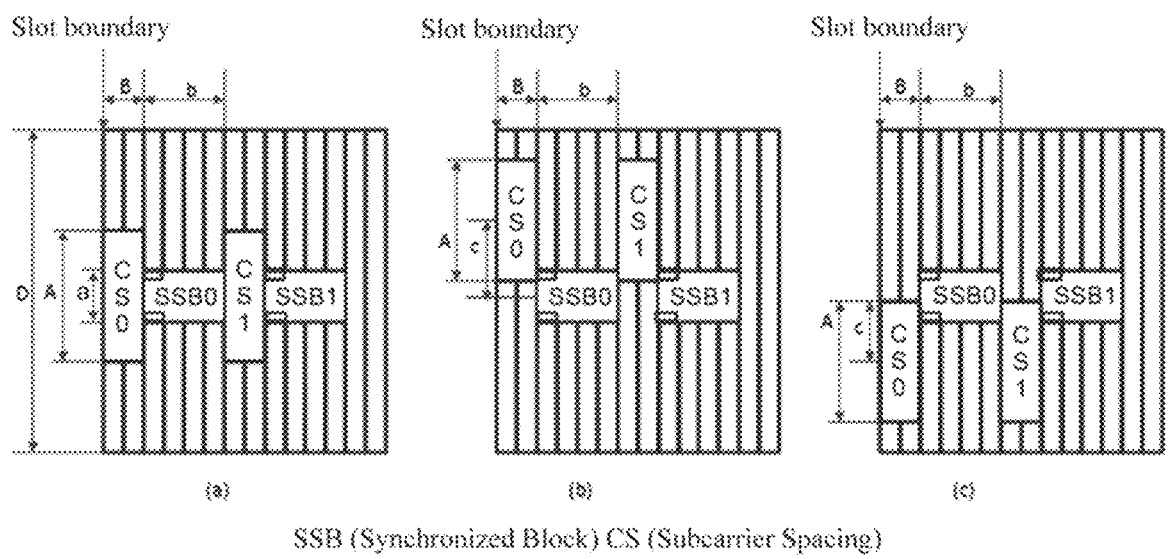
FIG. 1 are schematic diagrams illustrating RMSI CORESET configuration methods in various frequency division multiplexing modes provided by an embodiment of the present application.

An embodiment of the present application provides a configuration method of the RMSI CORESET when the RMSI CORESET and the associated SS Block adopt the time division multiplexing mode, where transmission of the RMSI CORESET and the associated SS Block the time division multiplexing mode may be as shown in FIG. 1. Here, regarding the RMSI CORESET and the associated SS Block, the configuration parameters of the RMSI CORESET are notified through the PBCH contained in the SS Block, so the RMSI CORESET is associated with the SS Block.

In FIG. 1, 'A' is the bandwidth in granularity of Physical Resource Block (PRB), occupied by the RMSI CORESET; 'B' is the number of consecutive symbols occupied by the RMSI CORESET in time-domain; 'D' is the minimum carrier bandwidth in granularity of PRB of the terminal; 'a' is the bandwidth occupied by the SS Block; 'b' is the number of symbols occupied by the SS Block in time-domain; and 'c' is the indication of the frequency offset from the position of SS Block to that of the RMSI CORESET.

At the same center carrier frequency, the NR-PBCHs in all the SS Blocks in the SS Block burst bear the same content except for the SS Block index. Therefore, regardless of whether FDM or TDM is adopted by the RMSI CORESET and the SS Block, the RMSI CORESETs associated with all the SS Blocks in the SS Block burst set have the same configuration (for example, the same occupied bandwidth, frequency-domain position, occupied time-domain symbols, etc.) at the same center carrier frequency.

Therefore, In one embodiment, regardless of whether FDM or TDM mode is adopted by the RMSI CORESET and the SS Block, at the same center carrier frequency, the RMSI CORESETs associated with respective SS Blocks in any SS Block burst has the same configuration parameters (the same configuration parameters described here may refer to the configuration parameters of same type, and the values of the configuration parameters of same type corresponding to different RMSI CORESETs associated with different SS Blocks may be different or may be the same). The configuration parameters include, for example, the following specific configuration parameters:

the bandwidth occupied by the RMSI CORESET (shown as 'A' in FIG. 1);

the frequency-domain position of the RMSI CORESET;

the time-domain position of the RMSI CORESET;

the number of consecutive or non-consecutive time-domain symbols occupied by the RMSI CORESET (shown as 'B' in FIG. 1).

In addition, of course, other types of configuration parameters may also be included.

It is assumed that the RMSI CORESET occupies one or more time-domain symbols in the time domain, where the bandwidth occupied by the RMSI CORESET is the same on each time-domain symbol, that is to say, 'A' has the same value on each time-domain symbol occupied by the RMSI CORESET, when multiple time-domain symbols are occupied. Therefore, the total number of PRBs occupied by the RMSI CORESET may be calculated by using the formula of:

the total number of PRBs occupied by the RMSI CORESET=the occupied bandwidth of each time-domain symbol * the number of occupied consecutive time-domain symbols='A'*'B'.

For the TDM mode, in order to minimize the bit number of the configuration parameters of the RMSI CORESET borne by the NR-PBCH, compared to configuring the frequency-domain bandwidth and the number of consecutive time-domain symbols occupied by the RMSI CORESET, it is more effective to define multiple parameter sets {the number of occupied consecutive time-domain symbols, occupied bandwidth} for configuration based on the number of required Physical Resource Blocks (PRBs).

In addition, the reliable transmission of the NR-PDCCH scheduling the RMSI is considered. The total number of PRBs occupied by the NR-PDCCH should be at least 48 PRBs, to support the aggregation level 8 of the NR-PDCCH. Therefore, the candidate set of the total number of PRBs occupied by the NR-PDCCH is {48, 72, 96} PRBs.

Therefore, In one embodiment, the configuration parameters of the RMSI CORESET may further include the total number of PRBs occupied by the RMSI CORESET, and the total number of PRBs occupied by the RMSI CORESET is a discrete candidate set, for example, {48, 72, 96} PRBs.

In one embodiment, when the RMSI CORESET and the associated SS Block adopt the time division multiplexing mode, the configuration parameters of the RMSI CORESET at least contain a parameter set written {occupied bandwidth, the number of occupied consecutive time-domain symbols}={A, B}.

For example: when the RMSI CORESET and the associated SS Block adopt the time division multiplexing mode, the parameter set that may be contained in the configuration parameters of the RMSI CORESET is {occupied bandwidth, the number of occupied consecutive time-domain symbols}={A, B}, where the specific value of {occupied bandwidth, the number of occupied consecutive time-domain symbols} may be for example one of:

{48 PRBs, 1 time-domain symbol};
{72 PRBs, 1 time-domain symbol};
{96 PRBs, 1 time-domain symbol};
{24 PRBs, 2 consecutive time-domain symbols};
{36 PRBs, 2 consecutive time-domain symbols};
{48 PRBs, 2 consecutive time-domain symbols};
{16 PRBs, 3 consecutive time-domain symbols};
{24 PRBs, 3 consecutive time-domain symbols};
{32 PRBs, 3 consecutive time-domain symbols};
{12 PRBs, 4 consecutive time-domain symbols};
{18 PRBs, 4 consecutive time-domain symbols};
{24 PRBs, 4 consecutive time-domain symbols}.

Here the "PRBs" represent a plurality of physical resource blocks.

In one embodiment, the frequency-domain position of the RMSI CORESET may be indicated by the frequency-domain offset relative to that of the associated SS Block. Specifically, there are still many methods to implement the indication. For example, the reference points may be the center, start or end positions of the bandwidth occupied by the RMSI CORESET and the bandwidth occupied by the SS Block, respectively. For the TDM mode, there may be three kinds of relative relationships as follows, as shown in FIG. 1, where:

in FIG. 1(*a*), the RMSI CORESET and the associated SS Block share the position of bandwidth center;

in FIG. 1(*b*), the bandwidth center of the RMSI CORESET is located above the bandwidth center of the associated SS Block;

in FIG. 1(*c*), the bandwidth center of the RMSI CORESET is located below the bandwidth center of the associated SS Block.

Therefore, In one embodiment, when the RMSI CORESET and the associated SS Block adopt the time division multiplexing mode, the frequency-domain position relationship between them may be one of the following relationships:

the RMSI CORESET and the associated SS Block share the center position; for example, in FIG. 1(*a*), the centers of the frequency-domain positions of the CS0 and the associated SSB0 coincide, where CS represents the RMSI CORESET, SSB represents the SS Block, and the number following each of them represents the index (the same is applicable to the similar descriptions in other embodiments and will not be repeated later);

the bandwidth center of the RMSI CORESET is located below the bandwidth center of the associated SS Block; for example, in FIG. 1(*c*), the center of the frequency-domain position of the CS0 is located below the center of the frequency-domain position of the associated SSB0, where CS represents the RMSI CORESET, SSB represents the SS Block, and the number following each of them represents the index (the same is applicable to the similar descriptions in other embodiments and will not be repeated later);

the bandwidth center of the RMSI CORESET is located above the bandwidth center of the associated SS Block; for example, in FIG. 1(b), the center of the frequency-domain position of the CS0 is located above the center of the frequency-domain position of the associated SSB0, where CS represents the RMSI CORESET, SSB represents the SS Block, and the number following each of them represents the index (the same is applicable to the similar descriptions in other embodiments and will not be repeated later).

In order to minimize the bit number of the configuration parameters of the RMSI CORESET borne by the NR-PBCH, the granularity of the frequency-domain offset parameter 'c' in FIG. 1 should be specified by the standard, that is, a preset value, and there is no need to notify it in the NR-PBCH. Here, the granularity may be specified by the standard according to the carrier frequency, and different values may be configured for different carrier frequencies. For example, the granularities corresponding to a carrier frequency higher than 6 GHz and a carrier frequency lower than 6 GHz may be different.

Therefore, In one embodiment, when the RMSI CORESET and the associated SS Block adopt the time division multiplexing mode, the granularity of the relative offset between the frequency-domain positions of them may be predefined by the standard, and different values may be used for different frequency bands or frequency ranges. For example, for the smaller terminal minimum carrier bandwidth (e.g., 5 MHz or 10 MHz), the granularity may be 1 PRB, that is, c=1; and for the larger terminal minimum carrier bandwidth (e.g., 100 MHz or 400 MHz), the granularity may be multiple PRBs, e.g., 6 PRBs, that is, c=6.

Figure 2:
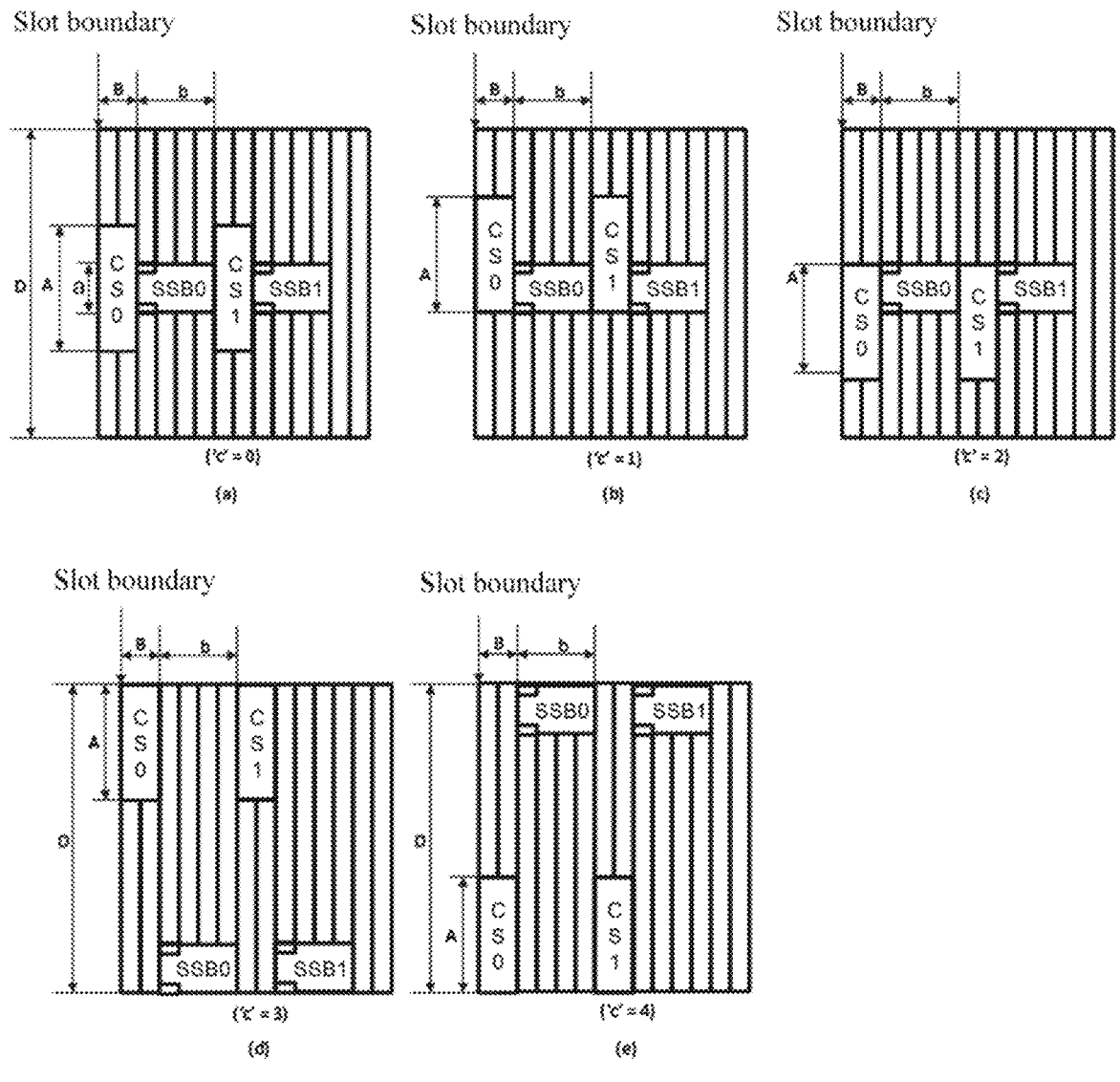
FIG. 2 are schematic diagrams of scenarios where the frequency-domain offset of the RMSI CORESET is indicated by a finite value in the time division multiplexing mode provided by an embodiment of the present application.

In addition, the frequency-domain offset value c may also be defined by a limited number of values. For example, 'c'={0, 1, 2, 3, 4} which respectively represent five kinds of relative relationships, as shown in FIGS. 2(a)-(e) respectively, specifically:

when c=0, it indicates that the center frequencies of the RMSI CORESET and the associated SS Block are aligned, which corresponds to FIG. 2(a);

when c=1, it indicates that the frequency-domain start positions of the RMSI CORESET and the associated SS Block are aligned, which corresponds to FIG. 2(b);

when c=2, it indicates that the frequency-domain end positions of the RMSI CORESET and the associated SS Block are aligned, which corresponds to FIG. 2(c);

when c=3, it indicates that the frequency-domain end position of the RMSI CORESET is aligned with the end position of the terminal minimum carrier bandwidth, but the frequency-domain start position of the SS Block associated with the RMSI CORESET is aligned with the start position of the terminal minimum carrier bandwidth, which corresponds to FIG. 2(d);

when c=4, it indicates that the frequency-domain start position of the RMSI CORESET is aligned with the start position of the terminal minimum carrier bandwidth, but the frequency-domain end position of the SS Block associated with the RMSI CORESET is aligned with the end position of the terminal minimum carrier bandwidth, which corresponds to FIG. 2(e).

In the embodiments of the present application, the specific value of the terminal minimum carrier bandwidth may be determined according to the actual demand, or may be preset.

In the NR system, the transmission pattern of the SS Block is related to the set Subcarrier Spacing (SCS). Different SCS values correspond to different SS Block transmission patterns. And, in the time slot where the SS Block is located, the time-domain symbol resources available for the RMSI CORESET transmission depend not only on the SS Block transmission pattern, but also on the configurations of the SS Block SCS and the RMSI CORESET SCS.

Figure 3:
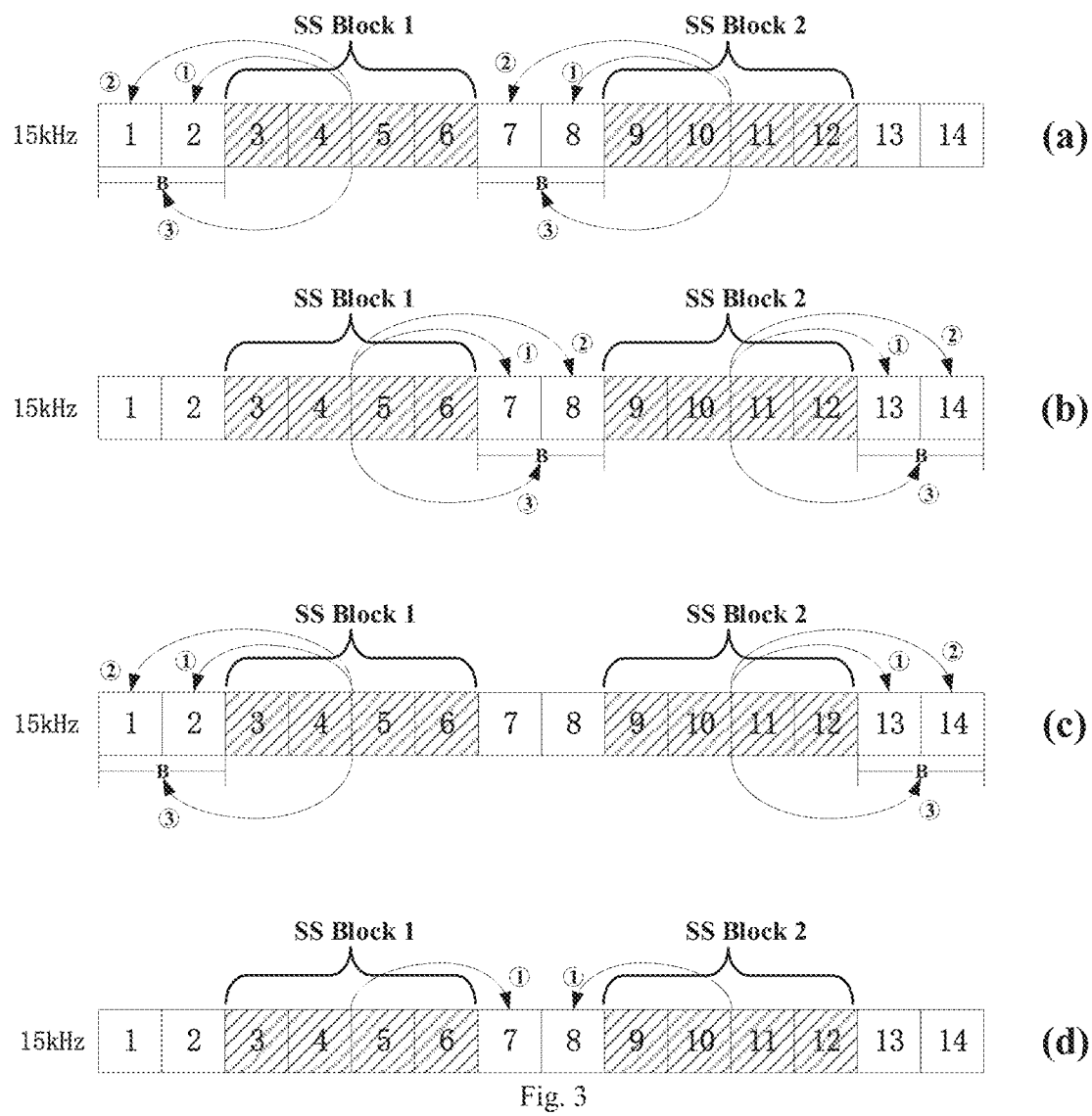
FIG. 3 are schematic diagrams illustrating the time-domain positions of the RMSI CORESET when the combination of the SS Block SCS and the RMSI CORESET SCS is {15, 15} kHz provided by an embodiment of the present application.

In the case of SS Block SCS=15 kHz, the SS Block transmission pattern is as shown in FIG. 3. The index of the first symbol that may be occupied by the SS Block (the time-domain number of the SS Block) is obtained by the following formula (the index granularity is based on that SCS=15 kHz):

$$\{2,8\}+14*n$$

here, when the carrier frequency (referred to as carrier frequency) is below 3 GHz, n=0, 1; and when the carrier frequency (referred to as carrier frequency) is 3-6 GHz, n=0, 1, 2, 3.

At this time, the RMSI CORESET SCS may be 15 kHz or 30 kHz. Thus, at this time, there are two combinations of SS Block SCS and RMSI CORESET SCS written {SS Block SCS, RMSI CORESET SCS}, which are {15, 15} kHz and {15, 30} kHz respectively.

Case 1: {15, 15} kHz

In the case that the combination of SS Block SCS and RMSI CORESET SCS is {15, 15} kHz, the time-domain position of the RMSI CORESET may be configured as follows.

As shown in FIG. 3(a), the time-domain position of each RMSI CORESET precedes the time-domain position of its associated SS Block; where, for each RMSI CORESET:

as shown in FIG. 3(a)①, the RMSI CORESET occupies one time-domain symbol, and the offset from the time-domain position of the SS Block associated with the RMSI CORESET to the time-domain position of the RMSI CORESET is −1; it is necessary to note that, in the embodiments of the present application, the offset value being a negative value indicates that the time-domain position of the RMSI CORESET precedes the time-domain position of the associated SS Block, and the offset value being a positive value indicates that the time-domain position of the RMSI CORESET is behind the time-domain position of the associated SS Block (the same is applicable to the following content, and will not be repeated later);

as shown in FIG. 3(a)②, the RMSI CORESET occupies 1 time-domain symbol, and the offset from the time-domain position of the SS Block associated with the RMSI CORESET to the time-domain position of the RMSI CORESET is −2;

as shown in FIG. 3(a)③, the RMSI CORESET occupies 2 time-domain symbols, and the offset from the time-domain position of the SS Block associated with the RMSI CORESET to the time-domain position of the RMSI CORESET is −2.

As shown in FIG. 3(b), the time-domain position of each RMSI CORESET is behind the time-domain position of SS Block associated with the RMSI CORESET; where, for each RMSI CORESET:

as shown in FIG. 3(b)①, the RMSI CORESET occupies 1 time-domain symbol, and the offset from the time-domain position of the SS Block associated with the RMSI CORESET to the time-domain position of the RMSI CORESET is +1;

as shown in FIG. 3(b)②, the RMSI CORESET occupies 1 time-domain symbol, and the offset from the time-domain position of the SS Block associated with the RMSI CORESET to the time-domain position of the RMSI CORESET is +2;

as shown in FIG. 3(b)③, the RMSI CORESET occupies 2 time-domain symbols, and the offset from the time-domain position of the SS Block associated with the RMSI CORESET to the time-domain position of the RMSI CORESET is +2.

As shown in FIG. 3(c), the time-domain position of the RMSI CORESET associated with an SS Block with an even index is placed just before the time-domain position of this SS Block; and the time-domain position of the RMSI CORESET associated with an SS Block with an odd index is placed just behind the time-domain position of this SS Block, where, for each RMSI CORESET:

as shown in FIG. 3(c)①, the RMSI CORESET occupies 1 time-domain symbol, and when mod (SSB Index, 2)={0} is satisfied, the offset from the time-domain position of the SS Block associated with the RMSI CORESET to the time-domain position of the RMSI CORESET is −1; when mod (SSB Index, 2)={1} is satisfied, the offset from the time-domain position of the SS Block associated with the RMSI CORESET to the time-domain position of the RMSI CORESET is +1;

as shown in FIG. 3(c)②, the RMSI CORESET occupies 1 time-domain symbol, and when mod (SSB Index, 2)={0} is satisfied, the offset from the time-domain position of the SS Block associated with the RMSI CORESET to the time-domain position of the RMSI CORESET is −2; when mod (SSB Index, 2)={1} is satisfied, the offset from the time-domain position of the SS Block associated with the RMSI CORESET to the time-domain position of the RMSI CORESET is +2;

as shown in FIG. 3(c)③, the RMSI CORESET occupies 2 time-domain symbols, and when mod (SSB Index, 2)={0} is satisfied, the offset from the time-domain position of the SS Block associated with the RMSI CORESET to the time-domain position of the RMSI CORESET is −2; when mod (SSB Index, 2)={1} is satisfied, the offset from the time-domain position of the SS Block associated with the RMSI CORESET to the time-domain position of the RMSI CORESET is +2.

As shown in FIG. 3(d), the time-domain position of the RMSI CORESET associated with an SS Block with an even index is placed just behind the time-domain position of this SS Block; and the time-domain position of the RMSI CORESET associated with an SS Block with an odd index is placed just before the time-domain position of this SS Block, where, for each RMSI CORESET:

as shown in FIG. 3(d)①, the RMSI CORESET occupies 1 time-domain symbol, and when mod (SSB Index, 2)={0} is satisfied, the offset from the time-domain position of the SS Block associated with the RMSI CORESET to the time-domain position of the RMSI CORESET is +1; when mod (SSB Index, 2)={1} is satisfied, the offset from the time-domain position of the SS Block associated with the RMSI CORESET to the time-domain position of the RMSI CORESET is −1.

In the embodiments of the present application, the Index represents index.

Case 2: {15, 30} kHz

In the case that the combination of SS Block SCS and RMSI CORESET SCS is {15, 30} kHz, the time-domain position of the RMSI CORESET may be configured as follows: the value of the number 'B' of time-domain symbols occupied by each RMSI CORESET may be 1, 2, 3, 4; where, for each RMSI CORESET:

as shown by the lower dash-dash-dot lines in FIG. 4(b), the time-domain position of the RMSI CORESET precedes the time-domain position of the SS Block associated with the RMSI CORESET, and the offset from the time-domain position of the SS Block associated with the RMSI CORESET to the time-domain position of the RMSI CORESET is −B;

as shown by the upper dash-dot lines in FIG. 4(b), the time-domain position of the RMSI CORESET is behind the time-domain position of the associated SS Block, and the offset from the time-domain position of the SS Block associated with the RMSI CORESET to the time-domain position of the RMSI CORESET is +B;

as shown in FIG. 4(c), the time-domain position of the RMSI CORESET associated with an SS Block with an even index precedes the time-domain position of this SS Block, and the offset from the time-domain position of the associated SS Block to the time-domain position of the RMSI CORESET is −B; the time-domain position of the RMSI CORESET associated with an SS Block with an odd index is behind the time-domain position of this SS Block, and the offset from the time-domain position of the associated SS Block to the time-domain position of the RMSI CORESET is +B.

Regarding SS Block SCS=30 kHz or 120 kHz, the configuration of the time-domain position of the RMSI CORESET is introduced as follows.

In the case of SS Block SCS=30 kHz or 120 kHz, the SS Block transmission pattern is as shown in FIG. 3. The index of the first symbol that may be occupied by the SS Block is obtained by the following formula:

$$\{4,8,16,20\}+28*n;$$

here, when the carrier frequency is below 3 GHz (less than or equal to 3 GHz), n=0; and when the carrier frequency is above 6 GHz (greater than or equal to 6 GHz), n=0, 1.

At this time, the combination of SS Block SCS and RMSI CORESET SCS written {SS Block SCS, RMSI CORESET SCS} may be {30, 15}, {30, 30}, {120, 60} or {120, 120} kHz. Here, the bandwidth and the number of time-domain symbols occupied by the RMSI CORESET are as described in the above-mentioned embodiments.

Case 1: {30, 30} or {120, 120}

Figure 5:
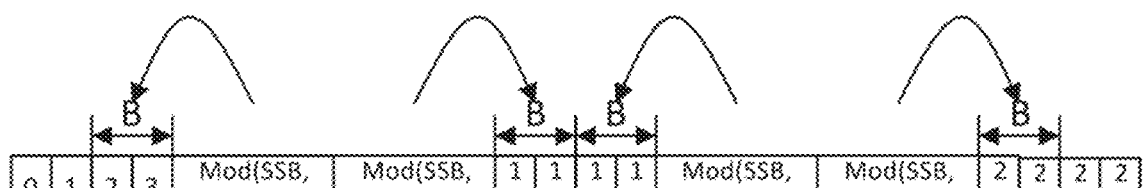
FIG. 5 are schematic diagrams illustrating the time-domain positions of the RMSI CORESET when the combination of the SS Block SCS and the RMSI CORESET SCS is {30, 30} or {120, 120} kHz provided by an embodiment of the present application.

FIG. 5 shows a possible configuration method of the time-domain position of the RMSI CORESET. Here, 'B' is the number of consecutive time-domain symbols occupied by the RMSI CORESET, and the value thereof may be 1 or 2.

As shown in FIG. 5, the time-domain position of the RMSI CORESET associated with an SS Block with an even index is placed just before the time-domain position of this SS Block; and the time-domain position of the RMSI CORESET associated with an SS Block with an odd index is placed just behind the time-domain position of this SS Block, where, for each RMSI CORESET:

when mod (SSB Index, 4)={0, 2} is satisfied, the offset from the time-domain position of the associated SS Block to the time-domain position of the RMSI CORESET is −B;

when mod (SSB Index, 4)={1, 3} is satisfied, the offset from the time-domain position of the associated SS Block to the time-domain position of the RMSI CORESET is +B.

Figure 6:
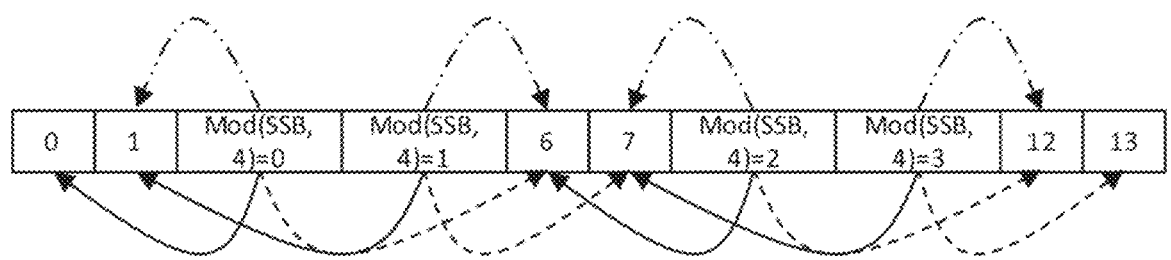
FIG. 6 are schematic diagrams illustrating the time-domain positions of the RMSI CORESET when the combination of the SS Block SCS and the RMSI CORESET SCS is {30, 151 or 1120, 60} kHz provided by an embodiment of the present application.

Case 2: {30, 15} or {120, 60};

As shown by the upper dash-dot-dot lines in FIG. 6, the time-domain position of the RMSI CORESET associated with an SS Block with an even index is placed just before the time-domain position of this SS Block; and the time-domain position of the RMSI CORESET associated with an SS Block with an odd index is placed just behind the time-domain position of this SS Block, where, for each RMSI CORESET:

when mod (SSB Index, 4)={0, 2} is satisfied, the offset from the time-domain position of the associated SS Block to the time-domain position of the RMSI CORESET is −1;

when mod (SSB Index, 4)={1, 3} is satisfied, the offset from the time-domain position of the associated SS Block to the time-domain position of the RMSI CORESET is +1.

As shown by the lower solid lines in FIG. 6, the time-domain position of the RMSI CORESET is placed before the time-domain position of the associated SS Block, where, for each RMSI CORESET:

when mod (SSB Index, 4)={0, 2} is satisfied, the offset from the time-domain position of the associated SS Block to the time-domain position of the RMSI CORESET is −2;

when mod (SSB Index, 4)={1, 3} is satisfied, the offset from the time-domain position of the associated SS Block to the time-domain position of the RMSI CORESET is −5.

As shown by the lower dashed lines in FIG. 6, the time-domain position of the RMSI CORESET is placed behind the time-domain position of the associated SS Block, where, for each RMSI CORESET:

when mod (SSB Index, 4)={0, 2} is satisfied, the offset from the time-domain position of the associated SS Block to the time-domain position of the RMSI CORESET is +4;

when mod (SSB Index, 4)={1, 3} is satisfied, the offset from the time-domain position of the associated SS Block to the time-domain position of the RMSI CORESET is +5.

In the case of SS Block SCS=240 kHz, the configuration of the time-domain position of the RMSI CORESET is introduced as follows.

Figure 4:
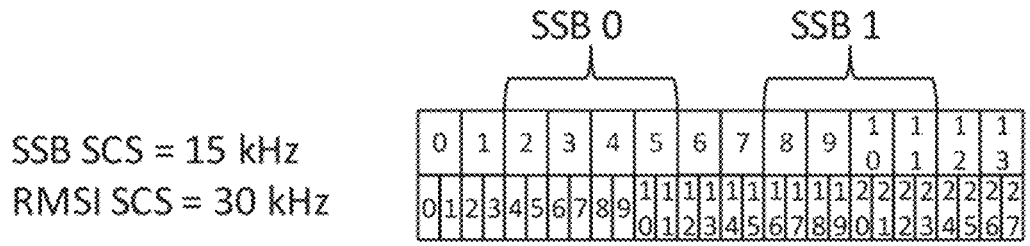
FIG. 4 are schematic diagrams illustrating the time-domain positions of the RMSI CORESET when the combination of the SS Block SCS and the RMSI CORESET SCS is {15, 30} kHz provided by an embodiment of the present application.
Figure 4:
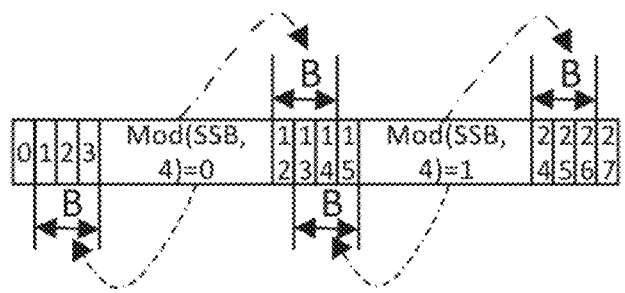
Figure 4:
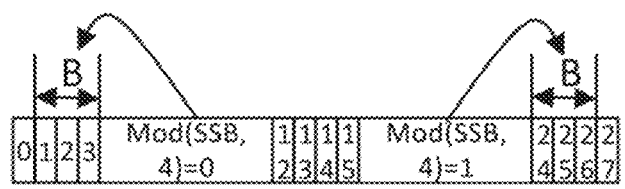

In the case of SS Block SCS=240 kHz, the SS Block transmission pattern is as shown in FIG. 4. The index of the first symbol that may be occupied by the SS Block is obtained by the following formula:

{8,12,16,20,32,36,40,44}+56*n;

where n=0, 1, 2, 3, 5, 6, 7, 8.

At this time, the combination of SS Block SCS and RMSI CORESET SCS written {SS Block SCS, RMSI CORESET SCS} may be {240, 120} or {240, 60} kHz. Here, the bandwidth and the number of time-domain symbols occupied by the RMSI CORESET are as described in the above-mentioned embodiments.

Figure 7:
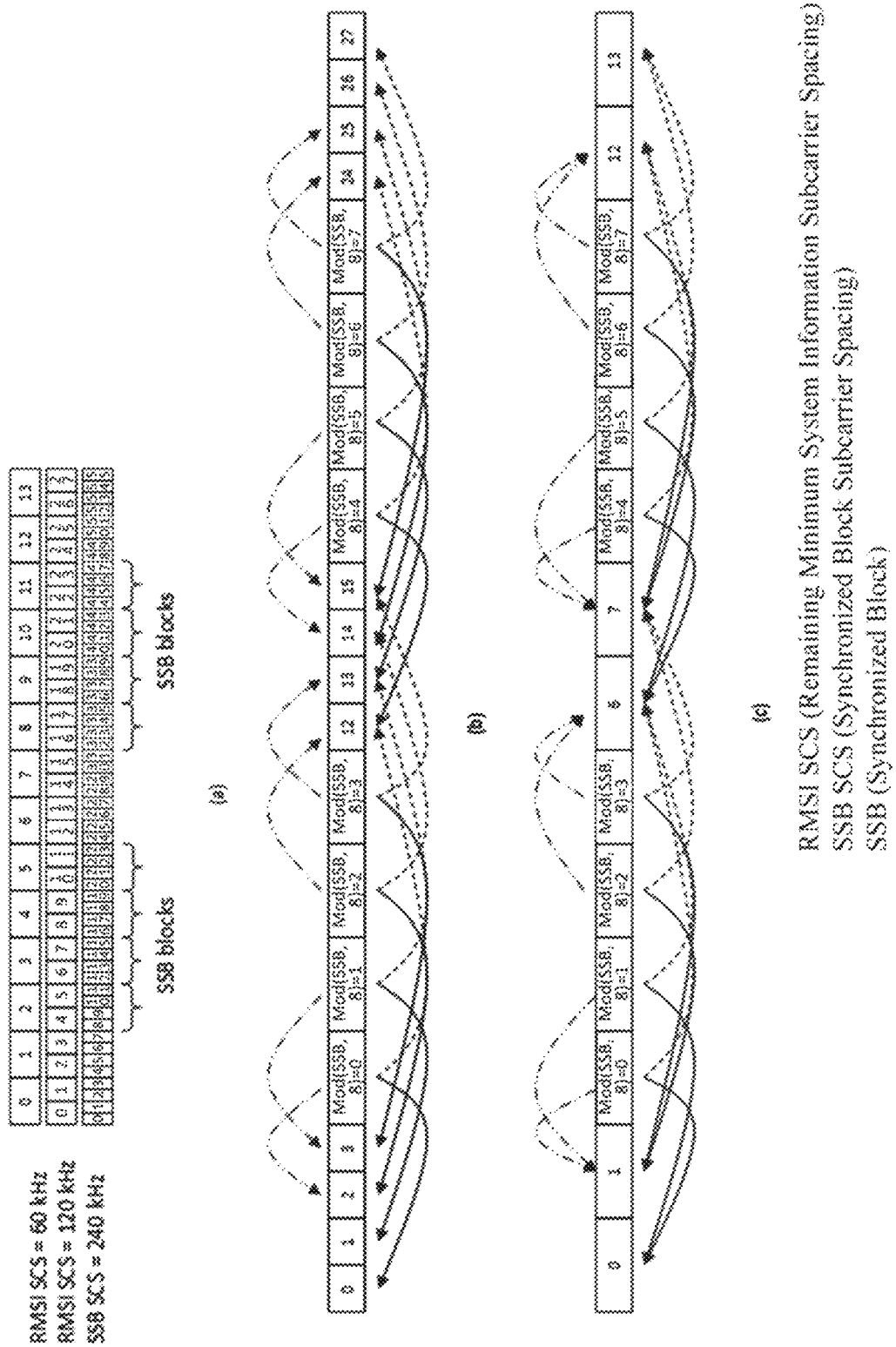
FIG. 7 are schematic diagrams illustrating the time-domain positions of the RMSI CORESET when the combination of the SS Block SCS and the RMSI CORESET SCS is {240, 120} or {240, 60} kHz provided by an embodiment of the present application.

Case 1: {240, 120}, as shown in FIG. 7(b)

As shown by the upper dash-dot-dot lines in FIG. 7(b), the time-domain position of the RMSI CORESET associated with an SS Block with an even index is placed just before the time-domain position of this SS Block; and the time-domain position of the RMSI CORESET associated with an SS Block with an odd index is placed just behind the time-domain position of this SS Block, wherein, for each RMSI CORESET:

when mod (SSB Index, 4)=10, 11 is satisfied, the offset from the time-domain position of the associated SS Block to the time-domain position of the RMSI CORESET is −2 or −3 time-domain symbols of 120 kHz;

when mod (SSB Index, 4)={2, 3} is satisfied, the offset from the time-domain position of the associated SS Block to the time-domain position of the RMSI CORESET is +4 or +3 time-domain symbols of 120 kHz.

As shown by the lower solid lines in FIG. 7(b), the time-domain position of the RMSI CORESET is placed before the time-domain position of the associated SS Block, where, for each RMSI CORESET:

when mod (SSB Index, 4)=n is satisfied, the offset from the time-domain position of the associated SS Block to the time-domain position of the RMSI CORESET is −((4−n)+2*n) time-domain symbols of 120 kHz.

As shown by the lower dashed lines in FIG. 7(b), the time-domain position of the RMSI CORESET is placed behind the time-domain position of the associated SS Block, where, for each RMSI CORESET:

when mod (SSB Index, 4)=n is satisfied, the offset from the time-domain position of the associated SS Block to the time-domain position of the RMSI CORESET is +(n+2*(4−n)) time-domain symbols of 120 kHz;

where n is a preset number greater than or equal to 0.

Case 2: {240, 60}, as shown in FIG. 7(c)

As shown by the upper dash-dot-dot lines in FIG. 7(c), the time-domain position of the RMSI CORESET associated with an SS Block with an even index is placed just before the time-domain position of this SS Block; and the time-domain position of the RMSI CORESET associated with an SS Block with an odd index is placed just behind the time-domain position of this SS Block, where, for each RMSI CORESET:

when mod (SSB Index, 4)=n={0, 1} is satisfied, the offset from the time-domain position of the associated SS Block to the time-domain position of the RMSI CORESET is −(n+1) time-domain symbols of 60 kHz;

when mod (SSB Index, 4)=n={2, 3} is satisfied, the offset from the time-domain position of the associated SS Block to the time-domain position of the RMSI CORESET is +(4−n) time-domain symbols of 60 kHz.

As shown by the lower solid lines in FIG. 7(c), the time-domain position of the RMSI CORESET is placed before the time-domain position of the associated SS Block, where, for each RMSI CORESET:

when mod (SSB Index, 4)=n={0, 1} is satisfied, the offset from the time-domain position of the associated SS Block to the time-domain position of the RMSI CORESET is −(2+n) time-domain symbols of 60 kHz;

when mod (SSB Index, 4)=n={2, 3} is satisfied, the offset from the time-domain position of the associated SS Block to the time-domain position of the RMSI CORESET is −(1+n) time-domain symbols of 60 kHz.

As shown by the lower dashed lines in FIG. 7(c), the time-domain position of the RMSI CORESET is placed behind the time-domain position of the associated SS Block, where, for each RMSI CORESET:

when mod (SSB Index, 4)=n={0, 1} is satisfied, the offset from the time-domain position of the associated SS Block to the time-domain position of the RMSI CORESET is (4−n) time-domain symbols of 60 kHz;

when mod (SSB Index, 4)=n={2, 3} is satisfied, the offset from the time-domain position of the associated SS Block to the time-domain position of the RMSI CORESET is (5−n) time-domain symbols of 60 kHz.

If all candidate SS Blocks are actually sent, then: in the case that SS Block SCS=240 kHz, the RMSI CORESET can only occupy one time-domain symbol when the RMSI CORESET is 120 kHz; and each RMSI CORESET can only share one time-domain symbol when the RMSI CORESET is 60 kHz. Therefore, in order to increase the time-domain symbols that may be occupied by the RMSI CORESET and improve the transmission performance of the RNSI CORESET, only seven out of every eight SS Blocks may be actually sent, and the remaining one position for the SS Block actually sends the RMSI CORESET, as shown in FIG. 8.

Figure 8:
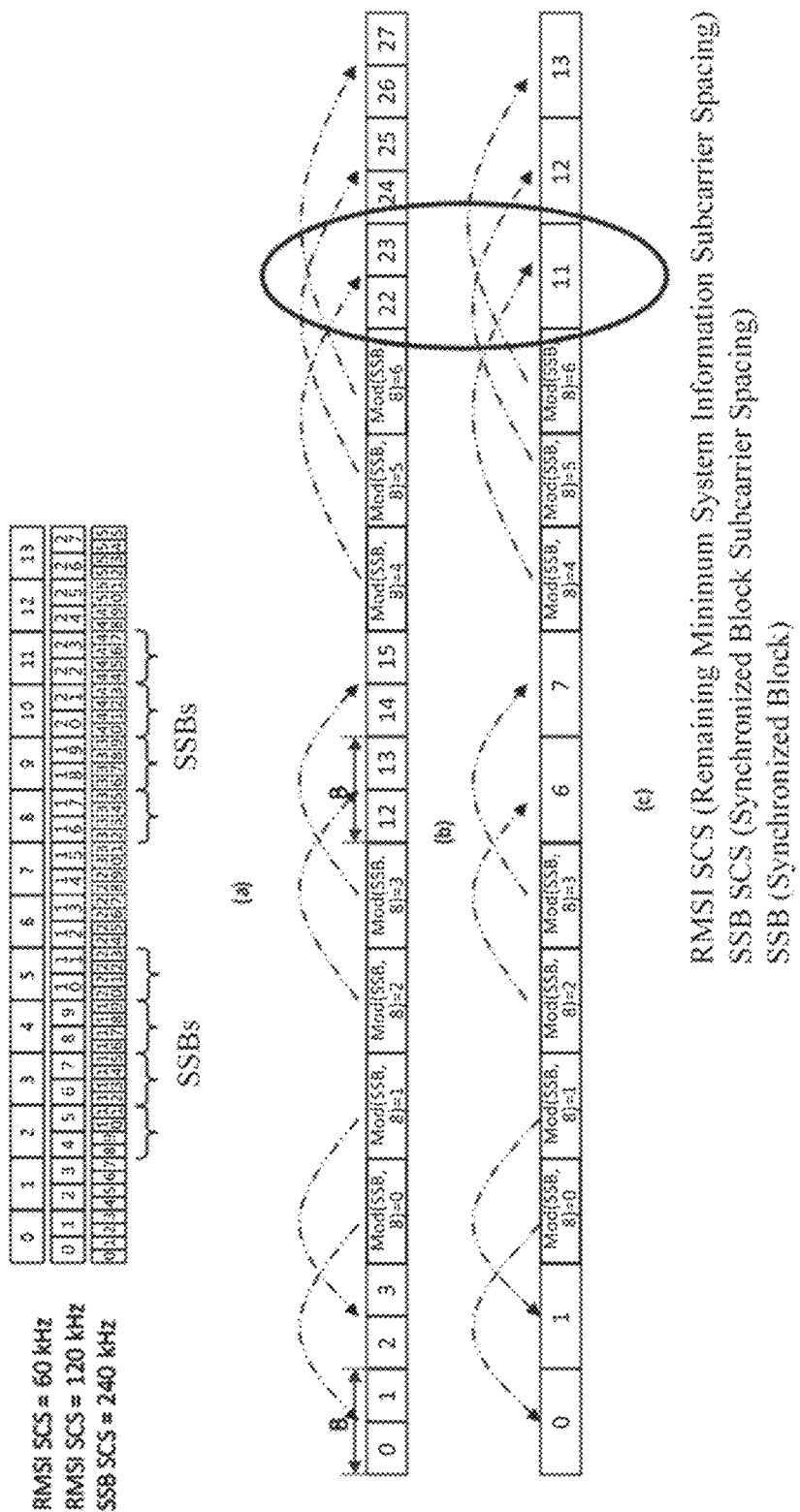
FIG. 8 are schematic diagrams illustrating the time-domain positions of the RMSI CORESET when the combination of the SS Block SCS and the RMSI CORESET SCS is {240, 120} or {240, 60} kHz provided by an embodiment of the present application.

Case 1: {240, 120}, as shown in FIG. 8(*b*)

The candidate time-domain position of the SS Block of which the index is mod (SSB Index, 7) is configured for the RMSI CORESET; the number of time-domain symbols occupied by each RMSI CORESET is B={1, 2} time-domain symbol(s), where, for each RMSI CORESET:

when the SS Block index satisfies mod (SSB Index, 8)={0, 1}, the time-domain position of the RMSI CORESET associated with this SS Block is placed before the time-domain position of this SS Block, and the time-domain position of this RMSI CORESET is offset from the time-domain position of the associated SS Block by $-((2-n)*B+2*n)$ time-domain symbols of 120 kHz;

when the SS Block index satisfies mod (SSB Index, 8)={2, 3}, the time-domain position of the RMSI CORESET associated with this SS Block is placed behind the time-domain position of this SS Block, and the time-domain position of this RMSI CORESET is offset from the time-domain position of the associated SS Block by $(2*(4-n)+(n-2)*B)$ time-domain symbols of 120 kHz;

when the SS Block index satisfies mod (SSB Index, 8)={4, 5, 6}, the time-domain position of the RMSI CORESET associated with this SS Block is placed behind the time-domain position of this SS Block, and the time-domain position of this RMSI CORESET is offset from the time-domain position of the associated SS Block by $(2*(7-n)+(n-4)*B)$ time-domain symbols of 120 kHz.

Case 2: {240, 60}, as shown in FIG. 8(*c*), where the circled part in the figure is explained as follows: 1 SS Block out of every 8 SS Blocks is not sent, and the position circled in the figure may be used for sending the RMSI CORESET, that is, the time-domain position shown in this circle is configured for the RMSI CORESET. This may allow the RMSI CORESET to occupy up to two consecutive time-domain symbols in this scenario.

The candidate time-domain position of the SS Block of which the index is mod (SSB Index, 7) is configured for the RMSI CORESET; the number of time-domain symbols occupied by each RMSI CORESET is B={1} time-domain symbol, where, for each RMSI CORESET:

when the SS Block index satisfies mod (SSB Index, 8)={0, 1}, the time-domain position of the RMSI CORESET associated with this SS Block is placed before the time-domain position of this SS Block, and the time-domain position of this RMSI CORESET is offset from the time-domain position of the associated SS Block by −2 time-domain symbols of 120 kHz;

when the SS Block index satisfies mod (SSB Index, 8)={2, 3}, the time-domain position of the RMSI CORESET associated with this SS Block is placed behind the time-domain position of this SS Block, and the time-domain position of this RMSI CORESET is offset from the time-domain position of the associated SS Block by 2 time-domain symbols of 120 kHz;

when the SS Block index satisfies mod (SSB Index, 8)={4, 5, 6}, the time-domain position of the RMSI CORESET associated with this SS Block is placed behind the time-domain position of this SS Block, and the time-domain position of this RMSI CORESET is offset from the time-domain position of the associated SS Block by 3 time-domain symbols of 120 kHz.

It is necessary to note that each RMSI CORESET described in the embodiments of the present application refers to, for example, the RMSI CORESET corresponding to each index, e.g., CS0 or CS1; and similarly, each SS Block described in the embodiments of the present application refers to, for example, the SS Block corresponding to each index, e.g., SSB0 or SSB1.

Figure 9:
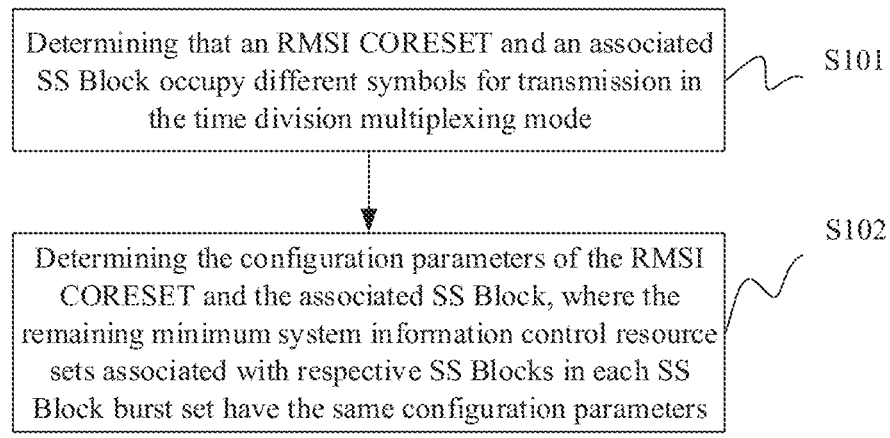
FIG. 9 is a flow schematic diagram of a resource configuration method provided by an embodiment of the present application.

In summary, referring to FIG. 9, a resource configuration method provided by an embodiment of the present application includes:

S101: determining that an RMSI CORESET and an associated SS Block occupy different symbols for transmission in the time division multiplexing mode;

S102: determining the configuration parameters of the RMSI CORESET and the associated SS Block, where an RMSI CORESET associated with each SS Block in each SS Block burst set has the same configuration parameters.

It should be noted that the method provided by the embodiment of the present application may be executed at the network side or may be executed at the terminal side, and the specific executive subject is not limited.

With this method, it is determined that the RMSI CORESET and the associated SS Block occupy different symbols for transmission in the time division multiplexing mode; and the configuration parameters of the RMSI CORESET and the associated SS Block is determined, where the RMSI CORESET associated with each SS Block in each SS Block burst set have the same configuration parameters, to enable the configuration of the RMSI CORESET to be more flexible when the RMSI CORESET and the associated SS block adopt the time division multiplexing mode, and to be applicable to more application scenarios.

In one embodiment, the configuration parameters of the RMSI CORESET include one or a combination of:

the bandwidth occupied by the RMSI CORESET;

the time-domain position of the RMSI CORESET;

the frequency-domain position of the RMSI CORESET;

the number of consecutive or non-consecutive time-domain symbols occupied by the RMSI CORESET.

In one embodiment, when the configuration parameters of the RMSI CORESET include the frequency-domain position of the RMSI CORESET, the frequency-domain positions of the RMSI CORESET and the associated SS Block satisfy one of the following relationships:

the configured RMSI CORESET and the associated SS Block share the center frequency-domain position;

the whole configured frequency-domain position of the RMSI CORESET is located below the frequency-domain position of the associated SS Block;

the whole configured frequency-domain position of the RMSI CORESET is located above the frequency-domain position of the associated SS Block.

In one embodiment, when the configuration parameters of the RMSI CORESET include the frequency-domain position of the RMSI CORESET, the frequency-domain position of the RMSI CORESET is a relative offset value with respect to the frequency-domain position of the associated SS Block.

In one embodiment, the relative offset value of the frequency-domain position of the RMSI CORESET relative to the frequency-domain position of the associated SS Block is a preset value.

In one embodiment, the relative offset value of the frequency-domain position of the RMSI CORESET relative to the frequency-domain position of the associated SS Block is different in different frequency bands or frequency ranges.

In one embodiment, the relative offset value of the frequency-domain position of the RMSI CORESET relative to the frequency-domain position of the associated SS Block is represented by c, and the values of c are as follows and respectively used to indicate the following different information:

when c=0, it indicates that the center frequencies of the RMSI CORESET and the associated SS Block are aligned;

when c=1, it indicates that the frequency-domain start positions of the RMSI CORESET and the associated SS Block are aligned;

when c=2, it indicates that the frequency-domain end positions of the RMSI CORESET and the associated SS Block are aligned;

when c=3, it indicates that the frequency-domain end position of the RMSI CORESET is aligned with the end position of the terminal minimum carrier bandwidth, but the frequency-domain start position of the associated SS Block is aligned with the start position of the terminal minimum carrier bandwidth;

when c=4, it indicates that the frequency-domain start position of the RMSI CORESET is aligned with the start position of the terminal minimum carrier bandwidth, but the frequency-domain end position of the associated SS Block is aligned with the end position of the terminal minimum carrier bandwidth;

where the terminal minimum carrier bandwidth is preset.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 15} kHz, the time-domain position of the RMSI CORESET adopts one of the following configurations:

first configuration: the time-domain position of the RMSI CORESET precedes the time-domain position of the associated SS Block;
  the RMSI CORESET occupies 1 time-domain symbol, and the offset from the time-domain position of the associated SS Block to the time-domain position of the RMSI CORESET is −1; or
  the RMSI CORESET occupies 1 time-domain symbol, and the offset from the time-domain position of the associated SS Block to the time-domain position of the RMSI CORESET is −2; or
  the RMSI CORESET occupies 2 time-domain symbols, and the offset from the time-domain position of the associated SS Block to the time-domain position of the RMSI CORESET is −2;

second configuration: the time-domain position of the RMSI CORESET is behind the time-domain position of the associated SS Block;
  the RMSI CORESET occupies 1 time-domain symbol, and the offset from the time-domain position of the associated SS Block to the time-domain position of the RMSI CORESET is +1; or
  the RMSI CORESET occupies 1 time-domain symbol, and the offset from the time-domain position of the associated SS Block to the time-domain position of the RMSI CORESET is +2; or
  the RMSI CORESET occupies 2 time-domain symbols, and the offset from the time-domain position of the associated SS Block to the time-domain position of the RMSI CORESET is +2;

third configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;
  the RMSI CORESET occupies 1 time-domain symbol, and when mod (SSB Index, 2)={0} is satisfied, the offset from the time-domain position of the associated SS Block to the time-domain position of the RMSI CORESET is −1; when mod (SSB Index, 2)={1} is satisfied, the offset from the time-domain position of the associated SS Block to the time-domain position of the RMSI CORESET is +1; or
  the RMSI CORESET occupies 1 time-domain symbol, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2; or
  the RMSI CORESET occupies 2 time-domain symbols, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2;

fourth configuration: the time-domain position of the RMSI CORESET associated with an SS Block with an even index is behind the time-domain position of this SS Block; and the time-domain position of the RMSI CORESET associated with an SS Block with an odd index precedes the time-domain position of this SS Block;
  the RMSI CORESET occupies 1 time-domain symbol, and when mod (SSB Index, 2)={0} is satisfied, the offset from the time-domain position of the associated SS Block to the time-domain position of the RMSI CORESET is +1; when mod (SSB Index, 2)={1} is satisfied, the offset from the time-domain position of the associated SS Block to the time-domain position of the RMSI CORESET is −1;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 30} kHz, the time-domain position of the RMSI CORESET adopts one of the following configurations:

first configuration: the time-domain position of the RMSI CORESET precedes the time-domain position of the associated SS Block, and the offset from the time-domain position of the associated SS Block to the time-domain position of the RMSI CORESET is −B;

second configuration: the time-domain position of the RMSI CORESET is behind the time-domain position of the associated SS Block, and the offset from the time-domain position of the associated SS Block to the time-domain position of the RMSI CORESET is +B;

third configuration: the time-domain position of the RMSI CORESET associated with an SS Block with an even index precedes the time-domain position of this SS Block, and the offset from the time-domain position of the associated SS Block to the time-domain position of the RMSI CORESET is −B; the time-domain position of the RMSI CORESET associated with an SS Block with an odd index is behind the time-domain position of this SS Block, and the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 30} or {120, 120} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

second configuration: when mod (SSB Index, 4)={0, 2} is satisfied, the offset from the time-domain position of the associated SS Block to the time-domain position of the RMSI CORESET is −B; wherein "SSB" is SS Block;

third configuration: when mod (SSB Index, 4)={1, 3} is satisfied, the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 15} or {120, 60} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

when mod (SSB Index, 4)={0, 2} is satisfied, the offset from the time-domain position of the associated SS Block to the time-domain position of the RMSI CORESET is −1; where "SSB" is SS Block;

when mod (SSB Index, 4)={1, 3} is satisfied, the offset from the time-domain position of the associated SS Block to the time-domain position of the RMSI CORESET is +1;

second configuration: the time-domain position of the RMSI CORESET precedes the time-domain position of the associated SS Block;

when mod (SSB Index, 4)={0, 2} is satisfied, the offset from the time-domain position of the associated SS Block to the time-domain position of the RMSI CORESET is −2;

when mod (SSB Index, 4)={1, 3} is satisfied, the offset from the time-domain position of the associated SS Block to the time-domain position of the RMSI CORESET is −5;

third configuration: the time-domain position of the RMSI CORESET is behind the time-domain position of the associated SS Block;

when mod (SSB Index, 4)={0, 2} is satisfied, the offset from the time-domain position of the associated SS Block to the time-domain position of the RMSI CORESET is +4;

when mod (SSB Index, 4)={1, 3} is satisfied, the offset from the time-domain position of the associated SS Block to the time-domain position of the RMSI CORESET is +5.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 120} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

when mod (SSB Index, 4)={0, 1} is satisfied, the offset from the time-domain position of the associated SS Block to the time-domain position of the RMSI CORESET is −2 or −3 time-domain symbols of 120 kHz;

when mod (SSB Index, 4)={2, 3} is satisfied, the offset from the time-domain position of the associated SS Block to the time-domain position of the RMSI CORESET is +4 or +3 time-domain symbols of 120 kHz;

second configuration: the time-domain position of the RMSI CORESET precedes the time-domain position of the associated SS Block;

when mod (SSB Index, 4)=n is satisfied, the offset from the time-domain position of the associated SS Block to the time-domain position of the RMSI CORESET is −((4−n)+2*n) time-domain symbols of 120 kHz;

third configuration: the time-domain position of the RMSI CORESET is behind the time-domain position of the associated SS Block;

when mod (SSB Index, 4)=n is satisfied, the offset from the time-domain position of the associated SS Block to the time-domain position of the RMSI CORESET is +(n+2*(4−n)) time-domain symbols of 120 kHz;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 60} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

when mod (SSB Index, 4)=n={0, 1} is satisfied, the offset from the time-domain position of the associated SS Block to the time-domain position of the RMSI CORESET is −(n+1) time-domain symbols of 60 kHz;

when mod (SSB Index, 4)=n={2, 3} is satisfied, the offset from the time-domain position of the associated SS Block to the time-domain position of the RMSI CORESET is +(4−n) time-domain symbols of 60 kHz;

second configuration: the time-domain position of the RMSI CORESET precedes the time-domain position of the associated SS Block;

when mod (SSB Index, 4)=n={0, 1} is satisfied, the offset from the time-domain position of the associated SS Block to the time-domain position of the RMSI CORESET is −(2+n) time-domain symbols of 60 kHz;

when mod (SSB Index, 4)=n={2, 3} is satisfied, the offset from the time-domain position of the associated SS Block to the time-domain position of the RMSI CORESET is −(1+n) time-domain symbols of 60 kHz;

third configuration: the time-domain position of the RMSI CORESET is behind the time-domain position of the associated SS Block;

when mod (SSB Index, 4)=n={0, 1} is satisfied, the offset from the time-domain position of the associated SS Block to the time-domain position of the RMSI CORESET is (4−n) time-domain symbols of 60 kHz;

when mod (SSB Index, 4)=n={2, 3} is satisfied, the offset from the time-domain position of the associated SS Block to the time-domain position of the RMSI CORESET is (5−n) time-domain symbols of 60 kHz;

where "SSB" is SS Block.

In one embodiment, determining the configuration parameters of the RMSI CORESET and the associated SS Block, includes: for the same or different configurations of SS Block SCSs and RMSI CORESET SCSs, if the SS Block is not actually sent, the time-domain position where the SS Block is not actually sent is configured for the RMSI CORESET.

In one embodiment, if the combination of SS Block SCS and RMSI CORESET SCS written {SS Block SCS, RMSI CORESET SCS} is {240, 120} or {240, 60} kHz, the position of one of every eight SS Blocks is the time-domain position of the RMSI CORESET.

In one embodiment, if the combination of SS Block SCS and RMSI CORESET SCS written {SS Block SCS, RMSI CORESET SCS} is {240, 120} kHz, the time-domain position of the RMSI CORESET adopts the following configuration:

the candidate time-domain position of an SS Block of which the index is mod (SSB Index, 7) is configured for the RMSI CORESET; the number of time-domain symbols occupied by the RMSI CORESET is B={1, 2} time-domain symbol(s); where:

when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is −((2−n)*B+2*n) time-domain symbols of 120 kHz;

when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is (2*(4−n)+(n−2)*B) time-domain symbols of 120 kHz;

when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is (2*(7−n)+(n−4)*B) time-domain symbols of 120 kHz;

where "SSB" is SS Block, and n is a preset value.

In one embodiment, if the combination of SS Block SCS and RMSI CORESET SCS written {SS Block SCS, RMSI CORESET SCS} is {240, 60} kHz, the time-domain position of the RMSI CORESET adopts the following configuration:

the candidate time-domain position of an SS Block of which the index is mod (SSB Index, 7) is configured for the RMSI CORESET; the number of time-domain symbols occupied by the RMSI CORESET is B={1} time-domain symbol; where:

when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is −2 time-domain symbols of 120 kHz;

when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is 2 time-domain symbols of 120 kHz;

when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is 3 time-domain symbols of 120 kHz;

where "SSB" is SS Block.

In one embodiment, the configuration parameters of the RMSI CORESET include the total number of PRBs occupied by the RMSI CORESET, where the number of PRBs is a discrete candidate set.

In one embodiment, the discrete candidate set is {48, 72, 96}.

In one embodiment, the configuration parameters of the RMSI CORESET include a combination of the bandwidth occupied by the RMSI CORESET and the number of consecutive time-domain symbols occupied by the RMSI CORESET, the combination is specifically one of:

{48 PRBs, 1 time-domain symbol};
{72 PRBs, 1 time-domain symbol};
{96 PRBs, 1 time-domain symbol};
{24 PRBs, 2 consecutive time-domain symbols};
{36 PRBs, 2 consecutive time-domain symbols};
{48 PRBs, 2 consecutive time-domain symbols};
{16 PRBs, 3 consecutive time-domain symbols};
{24 PRBs, 3 consecutive time-domain symbols};
{32 PRBs, 3 consecutive time-domain symbols};
{12 PRBs, 4 consecutive time-domain symbols};
{18 PRBs, 4 consecutive time-domain symbols};
{24 PRBs, 4 consecutive time-domain symbols};

where "PRBs" represent a plurality of physical resource blocks.

Figure 10:
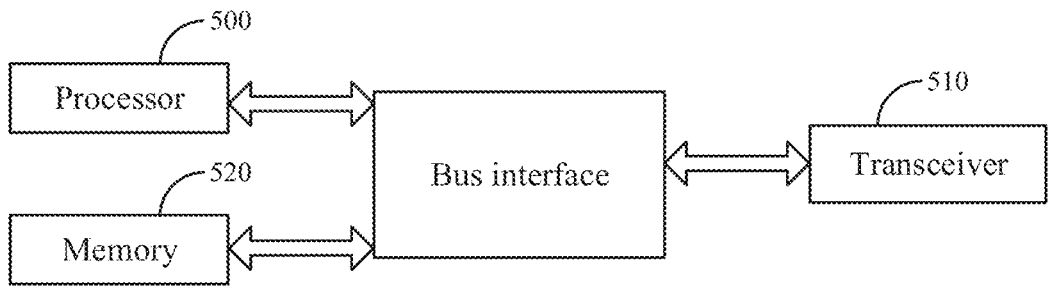
FIG. 10 is a structural schematic diagram of a resource configuration apparatus provided by an embodiment of the present application.

Correspondingly, referring to FIG. 10, a resource configuration apparatus provided by an embodiment of the present application includes:

a memory 520 configured to store program instructions;

a processor 500 configured to invoke the program instructions stored in the memory, and in accordance with the obtained program, perform the process of:

determining that an RMSI CORESET and an associated SS Block occupy different symbols for transmission in the time division multiplexing mode;

determining the configuration parameters of the RMSI CORESET and the associated SS Block, where the remaining minimum system information control resource set associated with each SS Block in each SS Block burst set has the same configuration parameters.

In one embodiment, the configuration parameters of the RMSI CORESET include one or a combination of:
the bandwidth occupied by the RMSI CORESET;
the time-domain position of the RMSI CORESET;
the frequency-domain position of the RMSI CORESET;
the number of consecutive or non-consecutive time-domain symbols occupied by the RMSI CORESET.

In one embodiment, when the configuration parameters of the RMSI CORESET include the frequency-domain position of the RMSI CORESET, the frequency-domain positions of the RMSI CORESET and the associated SS Block satisfy one of the following relationships:
the configured RMSI CORESET and the associated SS Block share the center frequency-domain position;
the whole configured frequency-domain position of the RMSI CORESET is located below the frequency-domain position of the associated SS Block;
the whole configured frequency-domain position of the RMSI CORESET is located above the frequency-domain position of the associated SS Block.

In one embodiment, when the configuration parameters of the RMSI CORESET include the frequency-domain position of the RMSI CORESET, the frequency-domain position of the RMSI CORESET is a relative offset value with respect to the frequency-domain position of the associated SS Block.

In one embodiment, the relative offset value of the frequency-domain position of the RMSI CORESET relative to the frequency-domain position of the associated SS Block is a preset value.

In one embodiment, the relative offset value of the frequency-domain position of the RMSI CORESET relative to the frequency-domain position of the associated SS Block is different in different frequency bands or frequency ranges.

In one embodiment, the relative offset value of the frequency-domain position of the RMSI CORESET relative to the frequency-domain position of the associated SS Block is represented by c, and the values of c are as follows and respectively used to indicate the following different information:
when c=0, it indicates that the center frequencies of the RMSI CORESET and the associated SS Block are aligned;
when c=1, it indicates that the frequency-domain start positions of the RMSI CORESET and the associated SS Block are aligned;
when c=2, it indicates that the frequency-domain end positions of the RMSI CORESET and the associated SS Block are aligned;
when c=3, it indicates that the frequency-domain end position of the RMSI CORESET is aligned with the end position of the terminal minimum carrier bandwidth, but the frequency-domain start position of the associated SS Block is aligned with the start position of the terminal minimum carrier bandwidth;
when c=4, it indicates that the frequency-domain start position of the RMSI CORESET is aligned with the start position of the terminal minimum carrier bandwidth, but the frequency-domain end position of the associated SS Block is aligned with the end position of the terminal minimum carrier bandwidth;
where the terminal minimum carrier bandwidth is preset.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 15} kHz, the time-domain position of the RMSI CORESET adopts one of the following configurations:
first configuration: the time-domain position of the RMSI CORESET precedes the time-domain position of the associated SS Block;
the RMSI CORESET occupies 1 time-domain symbol, and the offset from the time-domain position of the associated SS Block to the time-domain position of the RMSI CORESET is −1; or
the RMSI CORESET occupies 1 time-domain symbol, and the offset from the time-domain position of the associated SS Block to the time-domain position of the RMSI CORESET is −2; or
the RMSI CORESET occupies 2 time-domain symbols, and the offset from the time-domain position of the associated SS Block to the time-domain position of the RMSI CORESET is −2;
second configuration: the time-domain position of the RMSI CORESET is behind the time-domain position of the associated SS Block;
the RMSI CORESET occupies 1 time-domain symbol, and the offset from the time-domain position of the associated SS Block to the time-domain position of the RMSI CORESET is +1; or
the RMSI CORESET occupies 1 time-domain symbol, and the offset from the time-domain position of the associated SS Block to the time-domain position of the RMSI CORESET is +2; or
the RMSI CORESET occupies 2 time-domain symbols, and the offset from the time-domain position of the associated SS Block to the time-domain position of the RMSI CORESET is +2;
third configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;
the RMSI CORESET occupies 1 time-domain symbol, and when mod (SSB Index, 2)={0} is satisfied, the offset from the time-domain position of the associated SS Block to the time-domain position of the RMSI CORESET is −1; when mod (SSB Index, 2)={1} is satisfied, the offset from the time-domain position of the associated SS Block to the time-domain position of the RMSI CORESET is +1; or
the RMSI CORESET occupies 1 time-domain symbol, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2; or
the RMSI CORESET occupies 2 time-domain symbols, and when mod (SSB Index, 2)={0} is satisfied, the offset from the time-domain position of the associated SS Block to the time-domain position of the RMSI CORESET is −2; when mod (SSB Index, 2)={1} is satisfied, the offset from the time-domain position of the associated SS Block to the time-domain position of the RMSI CORESET is +2;
fourth configuration: the time-domain position of the RMSI CORESET associated with an SS Block with an even index is behind the time-domain position of this SS Block; and the time-domain position of the RMSI CORESET associated with an SS Block with an odd index precedes the time-domain position of this SS Block;

the RMSI CORESET occupies 1 time-domain symbol, and when mod (SSB Index, 2)={0} is satisfied, the offset from the time-domain position of the associated SS Block to the time-domain position of the RMSI CORESET is +1; when mod (SSB Index, 2)={1} is satisfied, the offset from the time-domain position of the associated SS Block to the time-domain position of the RMSI CORESET is −1;

where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {15, 30} kHz, the time-domain position of the RMSI CORESET adopts one of the following configurations:

first configuration: the time-domain position of the RMSI CORESET precedes the time-domain position of the associated SS Block, and the offset from the time-domain position of the associated SS Block to the time-domain position of the RMSI CORESET is −B;

second configuration: the time-domain position of the RMSI CORESET is behind the time-domain position of the associated SS Block, and the offset from the time-domain position of the associated SS Block to the time-domain position of the RMSI CORESET is +B;

third configuration: the time-domain position of the RMSI CORESET associated with an SS Block with an even index precedes the time-domain position of this SS Block, and the offset from the time-domain position of the associated SS Block to the time-domain position of the RMSI CORESET is −B; the time-domain position of the RMSI CORESET associated with an SS Block with an odd index is behind the time-domain position of this SS Block, and the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 30} or {120, 120} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

second configuration: when mod (SSB Index, 4)={0, 2} is satisfied, the offset from the time-domain position of the associated SS Block to the time-domain position of the RMSI CORESET is −B; wherein "SSB" is SS Block;

third configuration: when mod (SSB Index, 4)={1, 3} is satisfied, the offset from the time-domain position of the associated SS Block to the time-domain position of the RMSI CORESET is +B;

where B is the preset number of consecutive time-domain symbols occupied by the RMSI CORESET.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {30, 15} or {120, 60} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

when mod (SSB Index, 4)={0, 2} is satisfied, the offset from the time-domain position of the associated SS Block to the time-domain position of the RMSI CORESET is −1; where "SSB" is SS Block;

when mod (SSB Index, 4)={1, 3} is satisfied, the offset from the time-domain position of the associated SS Block to the time-domain position of the RMSI CORESET is +1;

second configuration: the time-domain position of the RMSI CORESET precedes the time-domain position of the associated SS Block;

when mod (SSB Index, 4)={0, 2} is satisfied, the offset from the time-domain position of the associated SS Block to the time-domain position of the RMSI CORESET is −2;

when mod (SSB Index, 4)={1, 3} is satisfied, the offset from the time-domain position of the associated SS Block to the time-domain position of the RMSI CORESET is −5;

third configuration: the time-domain position of the RMSI CORESET is behind the time-domain position of the associated SS Block;

when mod (SSB Index, 4)={0, 2} is satisfied, the offset from the time-domain position of the associated SS Block to the time-domain position of the RMSI CORESET is +4;

when mod (SSB Index, 4)={1, 3} is satisfied, the offset from the time-domain position of the associated SS Block to the time-domain position of the RMSI CORESET is +5.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 120} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;

when mod (SSB Index, 4)={0, 1} is satisfied, the offset from the time-domain position of the associated SS Block to the time-domain position of the RMSI CORESET is −2 or −3 time-domain symbols of 120 kHz;

when mod (SSB Index, 4)={2, 3} is satisfied, the offset from the time-domain position of the associated SS Block to the time-domain position of the RMSI CORESET is +4 or +3 time-domain symbols of 120 kHz;

second configuration: the time-domain position of the RMSI CORESET precedes the time-domain position of the associated SS Block;

when mod (SSB Index, 4)=n is satisfied, the offset from the time-domain position of the associated SS Block to the time-domain position of the RMSI CORESET is −((4−n)+2*n) time-domain symbols of 120 kHz;

third configuration: the time-domain position of the RMSI CORESET is behind the time-domain position of the associated SS Block;
  when mod (SSB Index, 4)=n is satisfied, the offset from the time-domain position of the associated SS Block to the time-domain position of the RMSI CORESET is +(n+2*(4−n)) time-domain symbols of 120 kHz;
  where "SSB" is SS Block.

In one embodiment, when the configuration parameters of the RMSI CORESET include the time-domain position of the RMSI CORESET, if a combination of SS Block SCS and RMSI CORESET SCS written {SS Block SCS, RMSI CORESET SCS} is {240, 60} kHz, the time-domain position of the RMSI CORESET adopts one of the following configurations:

first configuration: the time-domain position of the RMSI CORESET associated with an SS Block with an even index precedes the time-domain position of this SS Block; and the time-domain position of the RMSI CORESET associated with an SS Block with an odd index is behind the time-domain position of this SS Block;
  when mod (SSB Index, 4)=n={0, 1} is satisfied, the offset from the time-domain position of the associated SS Block to the time-domain position of the RMSI CORESET is −(n+1) time-domain symbols of 60 kHz;
  when mod (SSB Index, 4)=n={2, 3} is satisfied, the offset from the time-domain position of the associated SS Block to the time-domain position of the RMSI CORESET is +(4−n) time-domain symbols of 60 kHz;

second configuration: the time-domain position of the RMSI CORESET precedes the time-domain position of the associated SS Block;
  when mod (SSB Index, 4)=n={0, 1} is satisfied, the offset from the time-domain position of the associated SS Block to the time-domain position of the RMSI CORESET is −(2+n) time-domain symbols of 60 kHz;
  when mod (SSB Index, 4)=n={2, 3} is satisfied, the offset from the time-domain position of the associated SS Block to the time-domain position of the RMSI CORESET is −(1+n) time-domain symbols of 60 kHz;

third configuration: the time-domain position of the RMSI CORESET is behind the time-domain position of the associated SS Block;
  when mod (SSB Index, 4)=n={0, 1} is satisfied, the offset from the time-domain position of the associated SS Block to the time-domain position of the RMSI CORESET is (4−n) time-domain symbols of 60 kHz;
  when mod (SSB Index, 4)=n={2, 3} is satisfied, the offset from the time-domain position of the associated SS Block to the time-domain position of the RMSI CORESET is (5−n) time-domain symbols of 60 kHz;
  where "SSB" is SS Block.

In one embodiment, determining the configuration parameters of the RMSI CORESET and the associated SS Block, includes: for the same or different configurations of SS Block SCSs and RMSI CORESET SCSs, if the SS Block is not actually sent, the time-domain position where the SS Block is not actually sent is configured for the RMSI CORESET.

In one embodiment, if a combination of SS Block SCS and RMSI CORESET SCS written {SS Block SCS, RMSI CORESET SCS} is {240, 120} or {240, 60} kHz, the position of one of every eight SS Blocks is the time-domain position of the RMSI CORESET.

In one embodiment, if the combination of SS Block SCS and RMSI CORESET SCS written {SS Block SCS, RMSI CORESET SCS} is {240, 120} kHz, the time-domain position of the RMSI CORESET adopts the following configuration:
  the candidate time-domain position of an SS Block of which the index is mod (SSB Index, 7) is configured for the RMSI CORESET; the number of time-domain symbols occupied by the RMSI CORESET is B={1, 2} time-domain symbol(s); where:
    when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is −((2−n)*B+2*n) time-domain symbols of 120 kHz;
    when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is (2*(4−n)+(n−2)*B) time-domain symbols of 120 kHz;
    when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is (2*(7−n)+(n−4)*B) time-domain symbols of 120 kHz;
  where "SSB" is SS Block, and n is a preset value.

In one embodiment, if the combination of SS Block SCS and RMSI CORESET SCS written {SS Block SCS, RMSI CORESET SCS} is {240, 60} kHz, the time-domain position of the RMSI CORESET adopts the following configuration:
  the candidate time-domain position of an SS Block of which the index is mod (SSB Index, 7) is configured for the RMSI CORESET; the number of time-domain symbols occupied by the RMSI CORESET is B={1} time-domain symbol; where:
    when the SS Block index satisfies mod (SSB Index, 8)={0, 1}, the time-domain position of the associated RMSI CORESET precedes the time-domain position of this SS Block, and the offset from the time-domain position of the associated SS Block to the time-domain position of the RMSI CORESET is −2 time-domain symbols of 120 kHz;
    when the SS Block index satisfies mod (SSB Index, 8)={2, 3}, the time-domain position of the associated RMSI CORESET is behind the time-domain position of this SS Block, and the offset from the time-domain position of the associated SS Block to the time-domain position of the RMSI CORESET is 2 time-domain symbols of 120 kHz;
    when the SS Block index satisfies mod (SSB Index, 8)={4, 5, 6}, the time-domain position of the associated RMSI CORESET is behind the time-domain position of this SS Block, and the offset from the time-domain position of the associated SS Block to the time-domain position of the RMSI CORESET is 3 time-domain symbols of 120 kHz;
  where "SSB" is SS Block.

In one embodiment, the configuration parameters of the RMSI CORESET include the total number of PRBs occupied by the RMSI CORESET, wherein the number of PRBs is a discrete candidate set.

In one embodiment, the discrete candidate set is {48, 72, 96}.

In one embodiment, the configuration parameters of the RMSI CORESET include a combination of the bandwidth occupied by the RMSI CORESET and the number of consecutive time-domain symbols occupied by the RMSI CORESET, the combination is specifically one of:

{48 PRBs, 1 time-domain symbol};
{72 PRBs, 1 time-domain symbol};
{96 PRBs, 1 time-domain symbol};
{24 PRBs, 2 consecutive time-domain symbols};
{36 PRBs, 2 consecutive time-domain symbols};
{48 PRBs, 2 consecutive time-domain symbols};
{16 PRBs, 3 consecutive time-domain symbols};
{24 PRBs, 3 consecutive time-domain symbols};
{32 PRBs, 3 consecutive time-domain symbols};
{12 PRBs, 4 consecutive time-domain symbols};
{18 PRBs, 4 consecutive time-domain symbols};
{24 PRBs, 4 consecutive time-domain symbols};

where "PRBs" represent a plurality of physical resource blocks.

A transceiver 510 is configured to receive and send the data under the control of the processor 500.

Here, in FIG. 10, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

It should be noted that the device shown in FIG. 10 may be a network-side device or a terminal-side device. According to the actual demand, other devices not shown in FIG. 10 may further be added and set, and the details thereof will not be described here.

Figure 11:
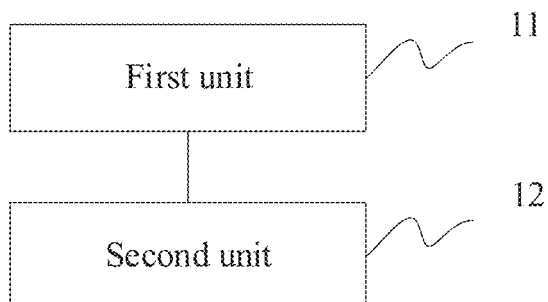
FIG. 11 is a structural schematic diagram of another resource configuration apparatus provided by an embodiment of the present application.

Referring to FIG. 11, another resource configuration apparatus provided by an embodiment of the present application includes:

a first unit 11 configured to determine that an RMSI CORESET and an associated SS Block occupy different symbols for transmission in the time division multiplexing mode;

a second unit 12 configured to determine the configuration parameters of the RMSI CORESET and the associated SS Block, where the remaining minimum system information control resource set associated with each SS Block in each SS Block burst set has the same configuration parameters.

The first unit may be a memory and the second unit may be a processor. That is to say, the device provided by the embodiment of the present application is not limited to the structure shown in FIG. 10, and may not include components such as transceiver and bus interface.

An embodiment of the present application provides a computer storage medium which is configured to store the computer program instructions used by the above-mentioned computing device, where the computer program instructions contain the program for performing the above-mentioned resource configuration method.

The computer storage medium can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application can be applied to the terminal devices, and can also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device can be a base station (e.g., access point), which means the device in the access network communicating with the wireless terminal via one or more sectors over the air interface. The base station may be used to perform the interconversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the invention.

In summary, in the embodiments of the present application, the RMSI CORESET is configured more flexibly as much as possible under consideration of the limited bits of the configuration parameters of the RMSI CORESET and the use of the TDM mode.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the invention have been described, those skilled in the art can make additional alterations and modifications to these embodiments once they learn about the basic creative concepts. Thus the attached claims are intended to be interpreted to include the embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A resource configuration method, comprising:
    determining that a Remaining Minimum System Information Control Resource Set (RMSI CORESET), and an associated Synchronous Information (SS) Block, occupy different symbols for transmission in a time division multiplexing mode;
    determining configuration parameters of the RMSI CORESET and the associated SS Block, wherein remaining minimum system information control resource sets associated with respective SS Blocks in each SS Block burst set have same configuration parameters;
    wherein the configuration parameters of the RMSI CORESET comprise one or a combination of:
    a bandwidth occupied by the RMSI CORESET;
    a time-domain position of the RMSI CORESET;
    a frequency-domain position of the RMSI CORESET; or
    a quantity of consecutive or non-consecutive time-domain symbols occupied by the RMSI CORESET;
    wherein when the configuration parameters of the RMSI CORESET comprise the frequency-domain position of the RMSI CORESET, frequency-domain positions of the RMSI CORESET and the associated SS Block satisfy one of following relationships:
    the RMSI CORESET and the associated SS Block share a configured center frequency-domain position;
    a whole configured frequency-domain position of the RMSI CORESET is located below the frequency-domain position of the associated SS Block; or
    the whole configured frequency-domain position of the RMSI CORESET is located above the frequency-domain position of the associated SS Block.

2. The method according to claim 1, wherein when the configuration parameters of the RMSI CORESET comprise the frequency-domain position of the RMSI CORESET, the frequency-domain position of the RMSI CORESET is a relative offset value with respect to a frequency-domain position of the associated SS Block.

3. The method according to claim 1, wherein when the configuration parameters of the RMSI CORESET comprise the time-domain position of the RMSI CORESET, when a combination of SS Block Subcarrier Spacing (SCS), and RMSI CORESET SCS written {SS Block SCS, RMSI CORESET SCS} is {15, 15} kHz, the time-domain position of the RMSI CORESET adopts one of following configurations:
    first configuration: the time-domain position of the RMSI CORESET precedes a time-domain position of the associated SS Block;
    the RMSI CORESET occupies 1 time-domain symbol, and an offset from the time-domain position of the associated SS Block to the time-domain position of the RMSI CORESET is −1; or
    the RMSI CORESET occupies 1 time-domain symbol, and the offset from the time-domain position of the associated SS Block to the time-domain position of the RMSI CORESET is −2; or
    the RMSI CORESET occupies 2 time-domain symbols, and the offset from the time-domain position of the associated SS Block to the time-domain position of the RMSI CORESET is −2;
    second configuration: the time-domain position of the RMSI CORESET is behind the time-domain position of the associated SS Block;
    the RMSI CORESET occupies 1 time-domain symbol, and the offset from the time-domain position of the associated SS Block to the time-domain position of the RMSI CORESET is +1; or
    the RMSI CORESET occupies 1 time-domain symbol, and the offset from the time-domain position of the associated SS Block to the time-domain position of the RMSI CORESET is +2; or
    the RMSI CORESET occupies 2 time-domain symbols, and the offset from the time-domain position of the associated SS Block to the time-domain position of the RMSI CORESET is +2;
    third configuration: a time-domain position of an RMSI CORESET associated with an SS Block with an even index precedes a time-domain position of this SS Block; and a time-domain position of an RMSI CORESET associated with an SS Block with an odd index is behind a time-domain position of this SS Block;
    an RMSI CORESET occupies 1 time-domain symbol, and when mod (SS Block Index, 2)={0} is satisfied, the offset from the time-domain position of the associated SS Block to the time-domain position of the RMSI CORESET is −1; when mod (SS Block Index, 2)={1} is satisfied, the offset from the time-domain position of the associated SS Block to the time-domain position of the RMSI CORESET is +1; or
    the RMSI CORESET occupies 1 time-domain symbol, and when mod (SS Block Index, 2)={0} is satisfied, the offset from the time-domain position of the associated SS Block to the time-domain position of the RMSI CORESET is −2; when mod (SS Block Index, 2)={1} is satisfied, the offset from the time-domain position of the associated SS Block to the time-domain position of the RMSI CORESET is +2; or the RMSI CORESET occupies 2 time-domain symbols, and when mod (SS Block Index, 2)={0} is satisfied, the offset from the time-domain position of the associated SS Block to the time-domain position of the RMSI CORESET is −2; when mod (SS Block Index, 2)={1} is satisfied, the offset from the time-domain position of the associated SS Block to the time-domain position of the RMSI CORESET is +2;

or fourth configuration: the time-domain position of the RMSI CORESET associated with the SS Block with the even index is behind the time-domain position of this SS Block; and the time-domain position of the RMSI CORESET associated with the SS Block with the odd index precedes the time-domain position of this SS Block;

the RMSI CORESET occupies 1 time-domain symbol, and when mod (SS Block Index, 2)={0} is satisfied, the offset from the time-domain position of the associated SS Block to the time-domain position of the RMSI CORESET is +1; when mod (SS Block Index, 2)={1} is satisfied, the offset from the time-domain position of the associated SS Block to the time-domain position of the RMSI CORESET is −1.

4. The method according to claim 1, wherein when the configuration parameters of the RMSI CORESET comprise the time-domain position of the RMSI CORESET, when a combination of SS Block Subcarrier Spacing (SCS), and RMSI CORESET SCS written {SS Block SCS, RMSI CORESET SCS} is {15, 30} kHz, the time-domain position of the RMSI CORESET adopts one of following configurations:

first configuration: the time-domain position of the RMSI CORESET precedes a time-domain position of the associated SS Block, and an offset from the time-domain position of the associated SS Block to the time-domain position of the RMSI CORESET is −B;

second configuration: the time-domain position of the RMSI CORESET is behind the time-domain position of the associated SS Block, and the offset from the time-domain position of the associated SS Block to the time-domain position of the RMSI CORESET is +B; or third configuration: a time-domain position of an RMSI CORESET associated with an SS Block with an even index precedes a time-domain position of this SS Block, and the offset from the time-domain position of the associated SS Block to the time-domain position of the RMSI CORESET is −B; a time-domain position of an RMSI CORESET associated with an SS Block with an odd index is behind a time-domain position of this SS Block, and the offset from the time-domain position of the associated SS Block to the time-domain position of the RMSI CORESET is +B;

wherein B is a preset quantity of consecutive time-domain symbols occupied by the RMSI CORESET.

5. The method according to claim 1, wherein when the configuration parameters of the RMSI CORESET comprise the time-domain position of the RMSI CORESET, when a combination of SS Block Subcarrier Spacing (SCS), and RMSI CORESET SCS written {SS Block SCS, RMSI CORESET SCS} is {30, 30} or {120, 120} kHz, the time-domain position of the RMSI CORESET adopts one of following configurations:

first configuration: a time-domain position of an RMSI CORESET associated with an SS Block with an even index precedes a time-domain position of this SS Block; and a time-domain position of an RMSI CORESET associated with an SS Block with an odd index is behind a time-domain position of this SS Block;

second configuration: when mod (SS Block Index, 4)={0, 2} is satisfied, an offset from the time-domain position of the associated SS Block to the time-domain position of the RMSI CORESET is −B; or third configuration: when mod (SS Block Index, 4)={1, 3} is satisfied, the offset from the time-domain position of the associated SS Block to the time-domain position of the RMSI CORESET is +B;

wherein B is a preset quantity of consecutive time-domain symbols occupied by the RMSI CORESET.

6. The method according to claim 1, wherein when the configuration parameters of the RMSI CORESET comprise the time-domain position of the RMSI CORESET, when a combination of SS Block Subcarrier Spacing (SCS), and RMSI CORESET SCS written {SS Block SCS, RMSI CORESET SCS} is {30, 15} or {120, 60} kHz, the time-domain position of the RMSI CORESET adopts one of following configurations:

first configuration: a time-domain position of an RMSI CORESET associated with an SS Block with an even index precedes a time-domain position of this SS Block; and a time-domain position of an RMSI CORESET associated with an SS Block with an odd index is behind a time-domain position of this SS Block;

when mod (SS Block Index, 4)={0, 2} is satisfied, an offset from the time-domain position of the associated SS Block to the time-domain position of the RMSI CORESET is −1;

when mod (SS Block Index, 4)={1, 3} is satisfied, the offset from the time-domain position of the associated SS Block to the time-domain position of the RMSI CORESET is +1;

second configuration: the time-domain position of the RMSI CORESET precedes the time-domain position of the associated SS Block;

when mod (SS Block Index, 4)={0, 2} is satisfied, the offset from the time-domain position of the associated SS Block to the time-domain position of the RMSI CORESET is −2;

when mod (SS Block Index, 4)={1, 3} is satisfied, the offset from the time-domain position of the associated SS Block to the time-domain position of the RMSI CORESET is −5;

or third configuration: the time-domain position of the RMSI CORESET is behind the time-domain position of the associated SS Block;

when mod (SS Block Index, 4)={0, 2} is satisfied, the offset from the time-domain position of the associated SS Block to the time-domain position of the RMSI CORESET is +4;

when mod (SS Block Index, 4)={1, 3} is satisfied, the offset from the time-domain position of the associated SS Block to the time-domain position of the RMSI CORESET is +5.

7. The method according to claim 1, wherein when the configuration parameters of the RMSI CORESET comprise the time-domain position of the RMSI CORESET, when a combination of SS Block Subcarrier Spacing (SCS), and RMSI CORESET SCS written {SS Block SCS, RMSI CORESET SCS} is {240, 120} kHz, the time-domain position of the RMSI CORESET adopts one of following configurations:
  first configuration: a time-domain position of an RMSI CORESET associated with an SS Block with an even index precedes a time-domain position of this SS Block; and a time-domain position of an RMSI CORESET associated with an SS Block with an odd index is behind a time-domain position of this SS Block;
  when mod (SS Block Index, 4)={0, 1} is satisfied, an offset from the time-domain position of the associated SS Block to the time-domain position of the RMSI CORESET is −2 or −3 time-domain symbols of 120 kHz;
  when mod (SS Block Index, 4)={2, 3} is satisfied, the offset from the time-domain position of the associated SS Block to the time-domain position of the RMSI CORESET is +4 or +3 time-domain symbols of 120 kHz;
  second configuration: the time-domain position of the RMSI CORESET precedes the time-domain position of the associated SS Block;
  when mod (SS Block Index, 4)=n is satisfied, the offset from the time-domain position of the associated SS Block to the time-domain position of the RMSI CORESET is −((4−n)+2*n) time-domain symbols of 120 kHz;
  or third configuration: the time-domain position of the RMSI CORESET is behind the time-domain position of the associated SS Block;
  when mod (SS Block Index, 4)=n is satisfied, the offset from the time-domain position of the associated SS Block to the time-domain position of the RMSI CORESET is +(n+2*(4−n)) time-domain symbols of 120 kHz.

8. The method according to claim 1, wherein when the configuration parameters of the RMSI CORESET comprise the time-domain position of the RMSI CORESET, when a combination of SS Block Subcarrier Spacing (SCS), and RMSI CORESET SCS written {SS Block SCS, RMSI CORESET SCS} is {240, 60} kHz, the time-domain position of the RMSI CORESET adopts one of following configurations:
  first configuration: a time-domain position of an RMSI CORESET associated with an SS Block with an even index precedes a time-domain position of this SS Block; and a time-domain position of an RMSI CORESET associated with an SS Block with an odd index is behind a time-domain position of this SS Block;
  when mod (SS Block Index, 4)=n={0, 1} is satisfied, an offset from the time-domain position of the associated SS Block to the time-domain position of the RMSI CORESET is −(n+1) time-domain symbols of 60 kHz;
  when mod (SS Block Index, 4)=n={2, 3} is satisfied, the offset from the time-domain position of the associated SS Block to the time-domain position of the RMSI CORESET is +(4−n) time-domain symbols of 60 kHz;
  second configuration: the time-domain position of the RMSI CORESET precedes the time-domain position of the associated SS Block;
  when mod (SS Block Index, 4)=n={0, 1} is satisfied, the offset from the time-domain position of the associated SS Block to the time-domain position of the RMSI CORESET is −(2+n) time-domain symbols of 60 kHz;
  when mod (SS Block Index, 4)=n={2, 3} is satisfied, the offset from the time-domain position of the associated SS Block to the time-domain position of the RMSI CORESET is −(1+n) time-domain symbols of 60 kHz;
  or third configuration: the time-domain position of the RMSI CORESET is behind the time-domain position of the associated SS Block;
  when mod (SS Block Index, 4)=n={0, 1} is satisfied, the offset from the time-domain position of the associated SS Block to the time-domain position of the RMSI CORESET is (4−n) time-domain symbols of 60 kHz;
  when mod (SS Block Index, 4)=n={2, 3} is satisfied, the offset from the time-domain position of the associated SS Block to the time-domain position of the RMSI CORESET is (5−n) time-domain symbols of 60 kHz.

9. The method according to claim 1, wherein determining configuration parameters of the RMSI CORESET and the associated SS Block, comprises: for same or different configurations of SS Block Subcarrier Spacings (SCS)s, and RMSI CORESET SCSs, when an SS Block is not actually sent, a time-domain position where the SS Block is not actually sent is configured for the RMSI CORESET.

10. The method according to claim 9, wherein when a combination of SS Block SCS, and RMSI CORESET SCS written {SS Block SCS, RMSI CORESET SCS} is {240, 120} or {240, 60} kHz, a position of one of every eight SS Blocks is configured as a time-domain position of the RMSI CORESET.

11. The method according to claim 10, wherein when the combination of SS Block SCS, and RMSI CORESET SCS written {SS Block SCS, RMSI CORESET SCS} is {240, 120} kHz, the time-domain position of the RMSI CORESET adopts the following configuration:
  a candidate time-domain position of an SS Block of which an index is mod (SS Block Index, 7) is configured for the RMSI CORESET; a quantity of time-domain symbols occupied by the RMSI CORESET is B={1, 2} time-domain symbol(s); wherein:
  when an SS Block index satisfies mod (SS Block Index, 8)={0, 1}, the time-domain position of the associated RMSI CORESET precedes the time-domain position of this SS Block, and an offset from the time-domain position of the associated SS Block to the time-domain position of the RMSI CORESET is −((2−n)*B+2*n) time-domain symbols of 120 kHz;
  when the SS Block index satisfies mod (SS Block Index, 8)={2, 3}, the time-domain position of the associated RMSI CORESET is behind the time-domain position of this SS Block, and the offset from the time-domain position of the associated SS Block to the time-domain position of the RMSI CORESET is (2*(4−n)+(n−2)*B) time-domain symbols of 120 kHz;
  when the SS Block index satisfies mod (SS Block Index, 8)={4, 5, 6}, the time-domain position of the associated RMSI CORESET is behind the time-domain position of this SS Block, and the offset from the time-domain position of the associated SS Block to the time-domain position of the RMSI CORESET is (2*(7−n)+(n−4)*B) time-domain symbols of 120 kHz;
  wherein n is a preset value.

12. The method according to claim 10, wherein when the combination of SS Block SCS, and RMSI CORESET SCS written {SS Block SCS, RMSI CORESET SCS} is {240, 60} kHz, the time-domain position of the RMSI CORESET adopts the following configuration:
  a candidate time-domain position of an SS Block of which an index is mod (SS Block Index, 7) is configured for the RMSI CORESET; a quantity of time-domain symbols occupied by the RMSI CORESET is B={1} time-domain symbol; wherein:

when an SS Block index satisfies mod (SS Block Index, 8)={0, 1}, the time-domain position of the associated RMSI CORESET precedes the time-domain position of this SS Block, and an offset from the time-domain position of the associated SS Block to the time-domain position of the RMSI CORESET is −2 time-domain symbols of 120 kHz;

when the SS Block index satisfies mod (SS Block Index, 8)={2, 3}, the time-domain position of the associated RMSI CORESET is behind the time-domain position of this SS Block, and the offset from the time-domain position of the associated SS Block to the time-domain position of the RMSI CORESET is 2 time-domain symbols of 120 kHz;

when the SS Block index satisfies mod (SS Block Index, 8)={4, 5, 6}, the time-domain position of the associated RMSI CORESET is behind the time-domain position of this SS Block, and the offset from the time-domain position of the associated SS Block to the time-domain position of the RMSI CORESET is 3 time-domain symbols of 120 kHz.

13. The method according to claim 1, wherein the configuration parameters of the RMSI CORESET comprise a total quantity of Physical Resource Blocks, PRBs, occupied by the RMSI CORESET, wherein the quantity of PRBs is a discrete candidate set.

14. The method according to claim 13, wherein the discrete candidate set is {48, 72, 96}.

15. The method according to claim 1, wherein when the configuration parameters of the RMSI CORESET comprise a combination of the bandwidth occupied by the RMSI CORESET and the quantity of consecutive time-domain symbols occupied by the RMSI CORESET, the combination is specifically one of:
{48 PRBs, 1 time-domain symbol};
{72 PRBs, 1 time-domain symbol};
{96 PRBs, 1 time-domain symbol};
{24 PRBs, 2 consecutive time-domain symbols};
{36 PRBs, 2 consecutive time-domain symbols};
{48 PRBs, 2 consecutive time-domain symbols};
{16 PRBs, 3 consecutive time-domain symbols};
{24 PRBs, 3 consecutive time-domain symbols};
{32 PRBs, 3 consecutive time-domain symbols};
{12 PRBs, 4 consecutive time-domain symbols};
{18 PRBs, 4 consecutive time-domain symbols}; or
{24 PRBs, 4 consecutive time-domain symbols}.
wherein "PRBs" represent a plurality of physical resource blocks.

16. A resource configuration apparatus, comprising:
a memory configured to store program instructions;
a processor configured to invoke the program instructions stored in the memory, and in accordance with the obtained program, to perform:
determining that a Remaining Minimum System Information Control Resource Set (RMSI CORESET), and an associated Synchronous Information (SS) Block, occupy different symbols for transmission in a time division multiplexing mode;
determining configuration parameters of the RMSI CORESET and the associated SS Block, wherein remaining minimum system information control resource sets associated with respective SS Blocks in each SS Block burst set have same configuration parameters;
wherein the configuration parameters of the RMSI CORESET comprise one or a combination of:
a bandwidth occupied by the RMSI CORESET;
a time-domain position of the RMSI CORESET;
a frequency-domain position of the RMSI CORESET; or
a quantity of consecutive or non-consecutive time-domain symbols occupied by the RMSI CORESET;
wherein when the configuration parameters of the RMSI CORESET comprise the frequency-domain position of the RMSI CORESET, frequency-domain positions of the RMSI CORESET and the associated SS Block satisfy one of following relationships:
the RMSI CORESET and the associated SS Block share a configured center frequency-domain position;
a whole configured frequency-domain position of the RMSI CORESET is located below the frequency-domain position of the associated SS Block; or
the whole configured frequency-domain position of the RMSI CORESET is located above the frequency-domain position of the associated SS Block.

17. A non-transitory computer storage medium, wherein the computer storage medium stores computer executable instructions which are configured to cause a computer to perform the method of claim 1.

18. The method according to claim 2, wherein the relative offset value is represented by c, and values of c are as follows and respectively used to indicate following different information:
when c=0, it indicates that center frequencies of the RMSI CORESET and the associated SS Block are aligned;
when c=1, it indicates that frequency-domain start positions of the RMSI CORESET and the associated SS Block are aligned;
when c=2, it indicates that frequency-domain end positions of the RMSI CORESET and the associated SS Block are aligned;
when c=3, it indicates that a frequency-domain end position of the RMSI CORESET is aligned with an end position of a terminal minimum carrier bandwidth, but a frequency-domain start position of the associated SS Block is aligned with a start position of the terminal minimum carrier bandwidth;
when c=4, it indicates that a frequency-domain start position of the RMSI CORESET is aligned with a start position of the terminal minimum carrier bandwidth, but a frequency-domain end position of the associated SS Block is aligned with an end position of the terminal minimum carrier bandwidth;
wherein the terminal minimum carrier bandwidth is preset.

19. The apparatus according to claim 16, wherein when the configuration parameters of the RMSI CORESET comprise the frequency-domain position of the RMSI CORESET, the frequency-domain position of the RMSI CORESET is a relative offset value with respect to a frequency-domain position of the associated SS Block.

* * * * *